US011130464B2

(12) United States Patent
Dinsdale et al.

(10) Patent No.: US 11,130,464 B2
(45) Date of Patent: Sep. 28, 2021

(54) MOUNTING TAB ASSEMBLIES FOR SECURING AN AIRBAG TO A VEHICLE

(71) Applicant: Autoliv ASP, Inc., Ogden, UT (US)

(72) Inventors: Charles Paul Dinsdale, Farr West, UT (US); Juan Carlos Garcia Callejas, Lomas del Marques (MX); Tyler Glen Christiansen, Pleasant View, UT (US); John Douglas Kemp, Murray, UT (US)

(73) Assignee: Autoliv ASP, Inc., Ogden, UT (US)

( * ) Notice: Subject to any disclaimer, the term of this patent is extended or adjusted under 35 U.S.C. 154(b) by 90 days.

(21) Appl. No.: 16/657,904

(22) Filed: Oct. 18, 2019

(65) Prior Publication Data

US 2020/0047699 A1 Feb. 13, 2020

Related U.S. Application Data

(63) Continuation-in-part of application No. 15/890,190, filed on Feb. 6, 2018, now Pat. No. 10,647,285.

(51) Int. Cl.
*B60R 21/232* (2011.01)
*B60R 21/213* (2011.01)
*B60R 21/215* (2011.01)

(52) U.S. Cl.
CPC .......... *B60R 21/215* (2013.01); *B60R 21/213* (2013.01); *B60R 21/232* (2013.01); *B60R 2021/21506* (2013.01)

(58) Field of Classification Search
CPC ... B60R 21/232; B60R 21/213; B60R 21/214; B60R 21/201; B60R 21/237; B60R 2021/23192

USPC .................................. 280/728.2, 730.2
See application file for complete search history.

(56) References Cited

U.S. PATENT DOCUMENTS

| | | | |
|---|---|---|---|
| 2011/0101659 A1 | 5/2011 | Nogami et al. | |
| 2014/0265266 A1* | 9/2014 | Kemp | B60R 21/232 280/728.2 |
| 2017/0088082 A1* | 3/2017 | Okuhara | B60R 21/213 |
| 2017/0182964 A1 | 6/2017 | Konaka et al. | |

(Continued)

FOREIGN PATENT DOCUMENTS

JP  2014184792  10/2014

OTHER PUBLICATIONS

Christiansen, et al., Office Action dated Nov. 27, 2019 for U.S. Appl. No. 15/890,190.

(Continued)

*Primary Examiner* — Keith J Frisby
(74) *Attorney, Agent, or Firm* — Stoel Rives LLP

(57) ABSTRACT

Tabs for coupling or securing an airbag to a vehicle are provided. A tab may include a first panel and a second panel that meet at a foldable portion. First and second arms may extend away from a central portion of the first panel in substantially opposite directions. First and second recesses may extend inward from first and second lateral edges, respectively, of the second panel. The tab may be configured to be folded to form a bracket receiving member. The bracket receiving member may be configured to be disposed through an aperture of a bracket to secure the tab to the vehicle. Additionally, the first and second panels of the tab may be configured to be secured to an airbag to secure the airbag to the vehicle via the tab and the bracket.

19 Claims, 19 Drawing Sheets

(56) References Cited

U.S. PATENT DOCUMENTS

2019/0241144 A1   8/2019   Christiansen et al.

OTHER PUBLICATIONS

PLM: Part Drawing 6274237 006, Autoliv Inc., Released Nov. 4, 2014.
International Search Report and Written Opinion dated Nov. 26, 2020 for international application PCT/US2020/054851.
Christiansen, et al., Notice of Allowance dated Mar. 10, 2020 for U.S. Appl. No. 15/890,190.

* cited by examiner

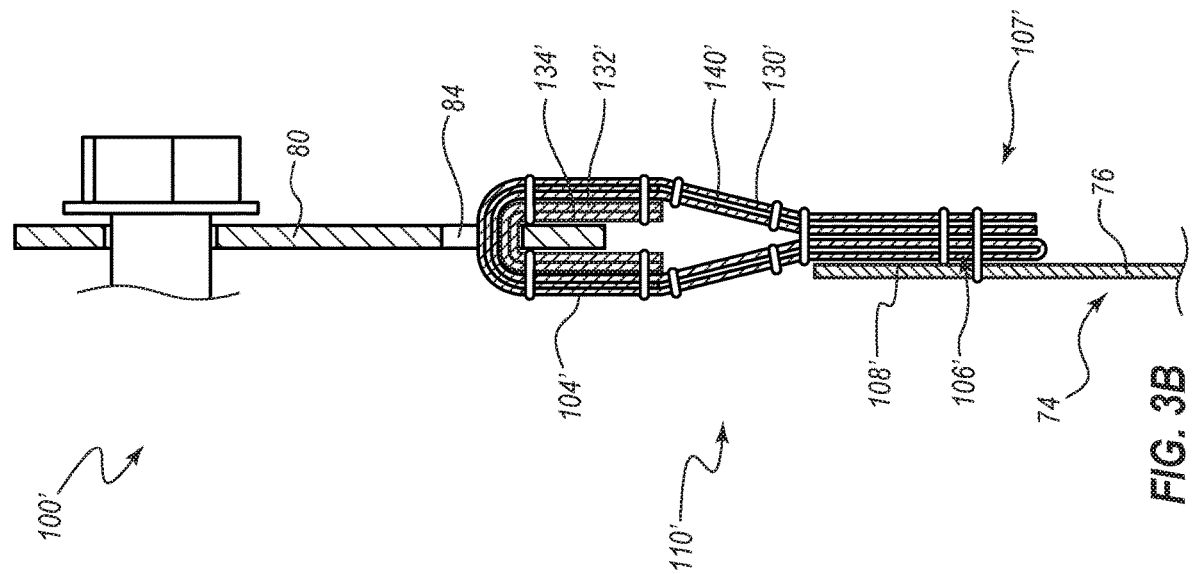
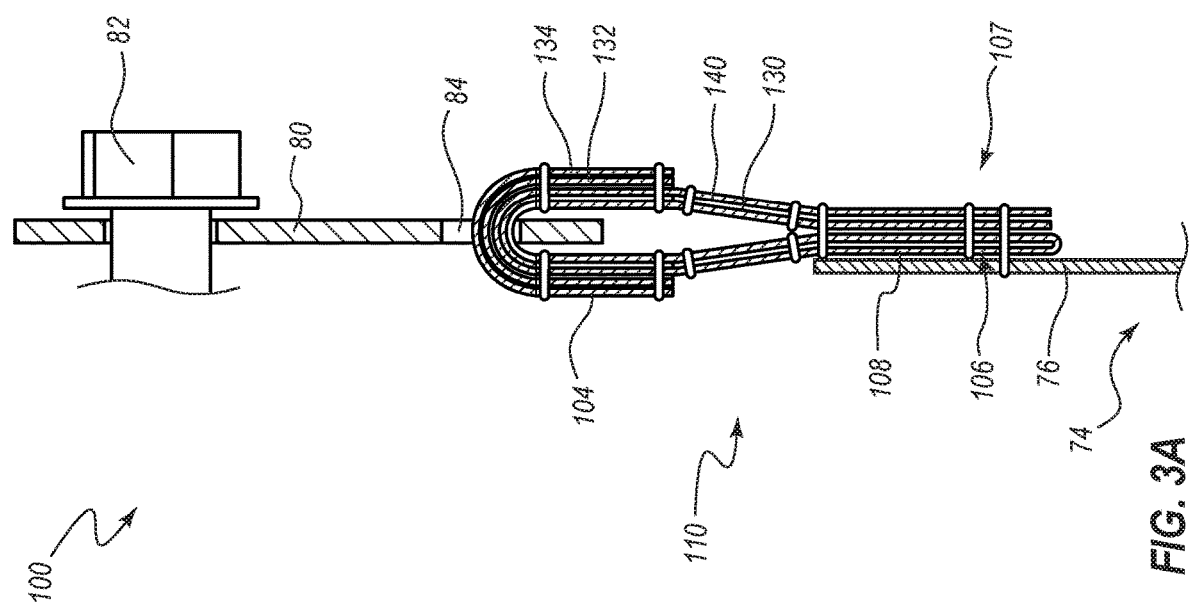

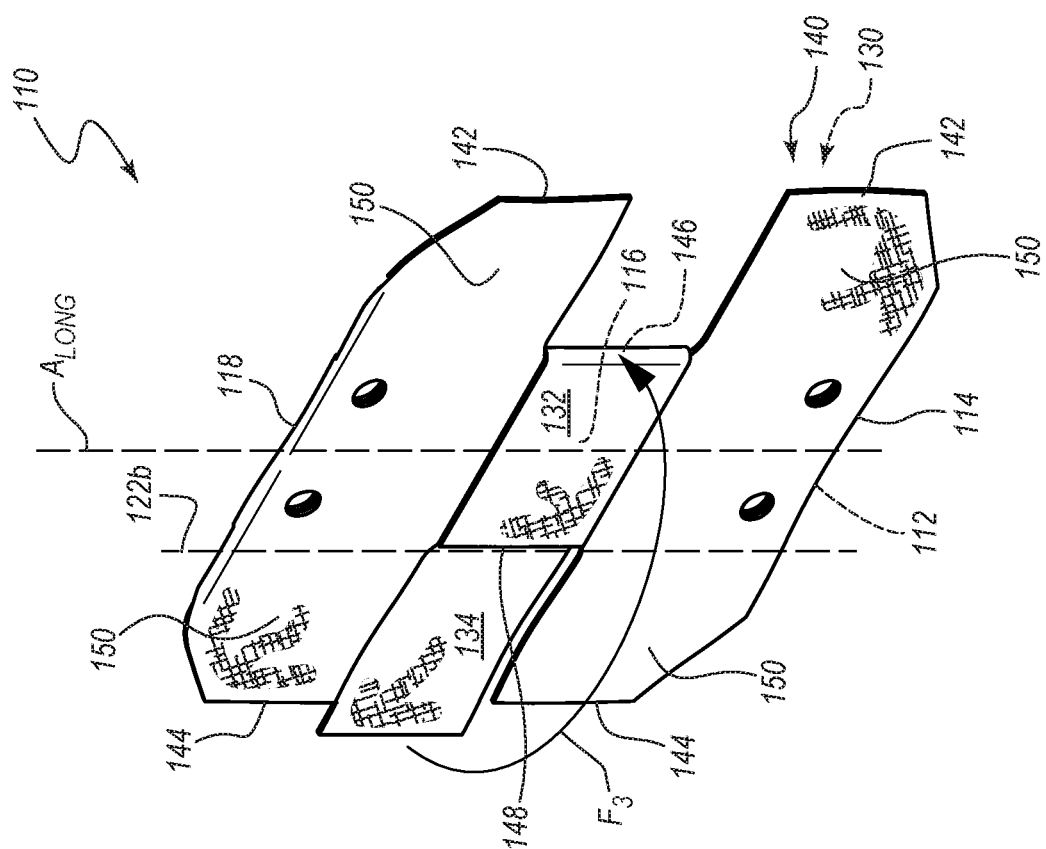
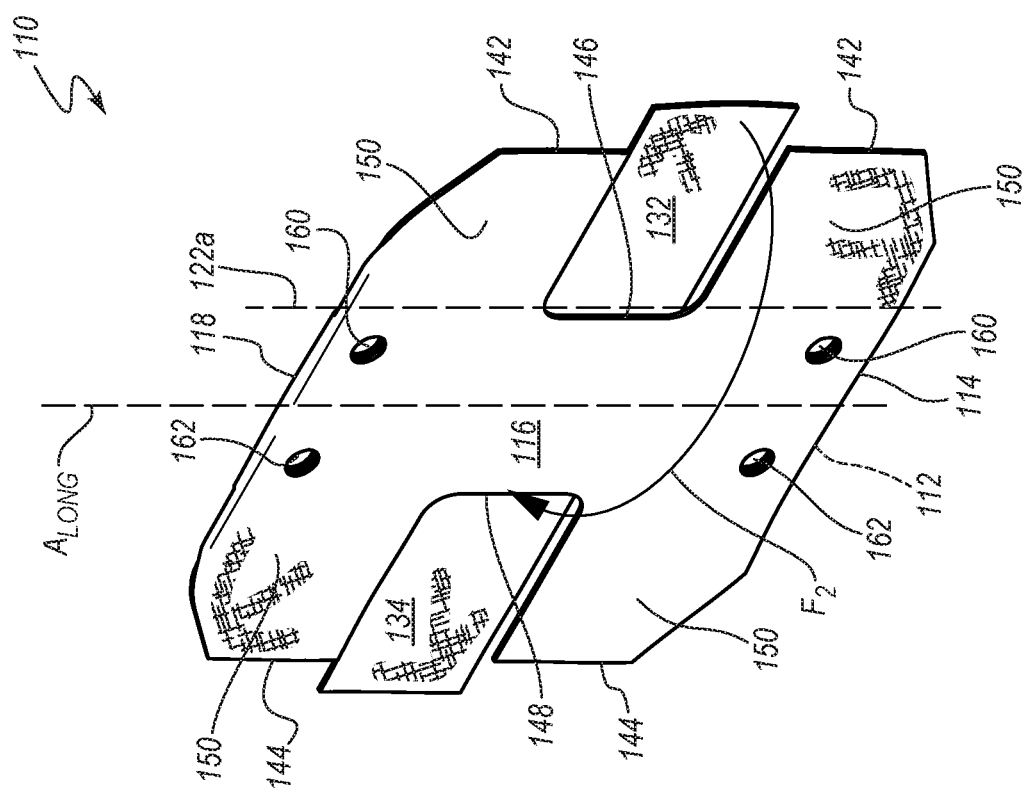
FIG. 4B
FIG. 4C

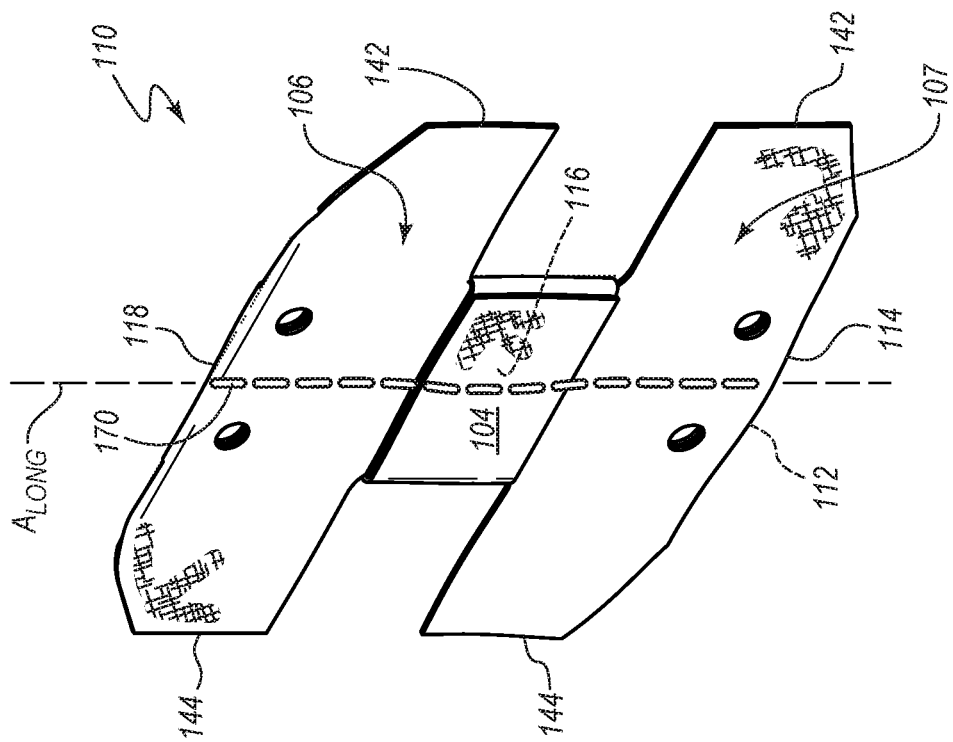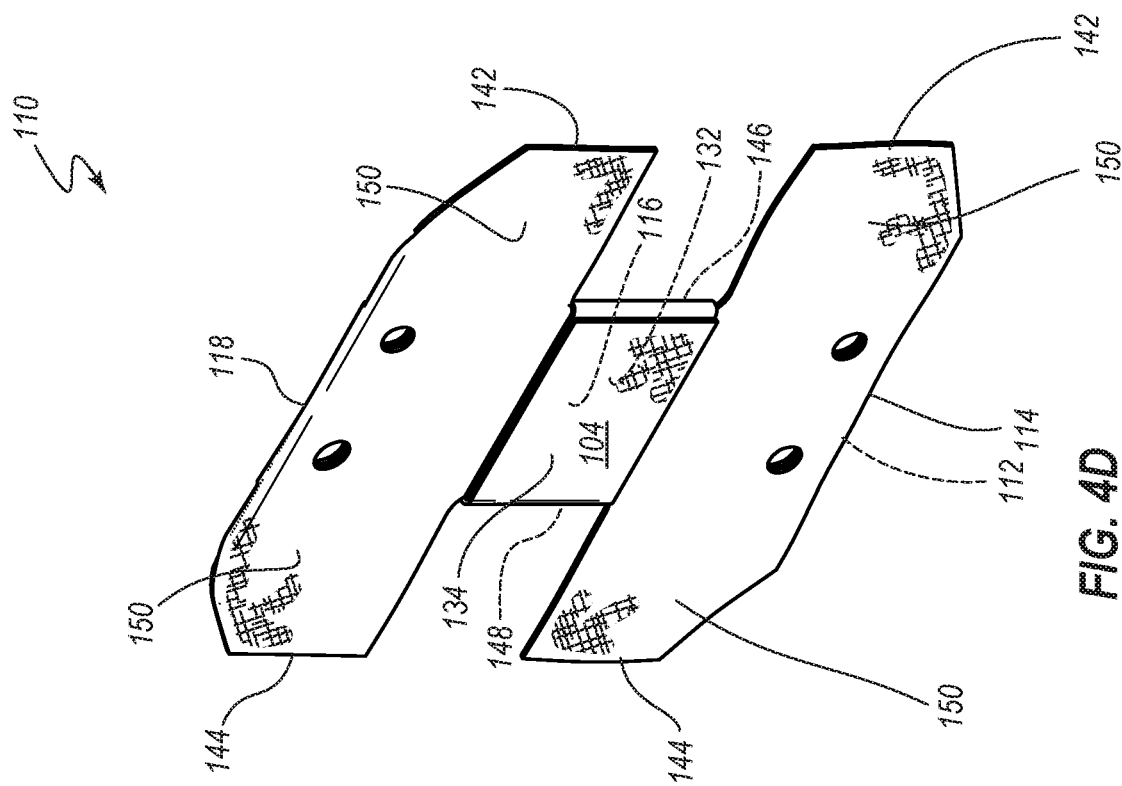

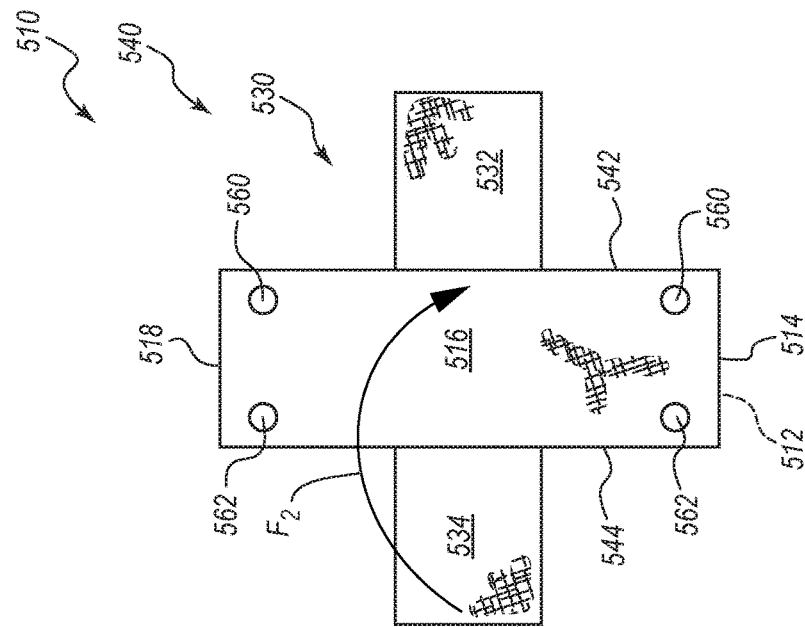
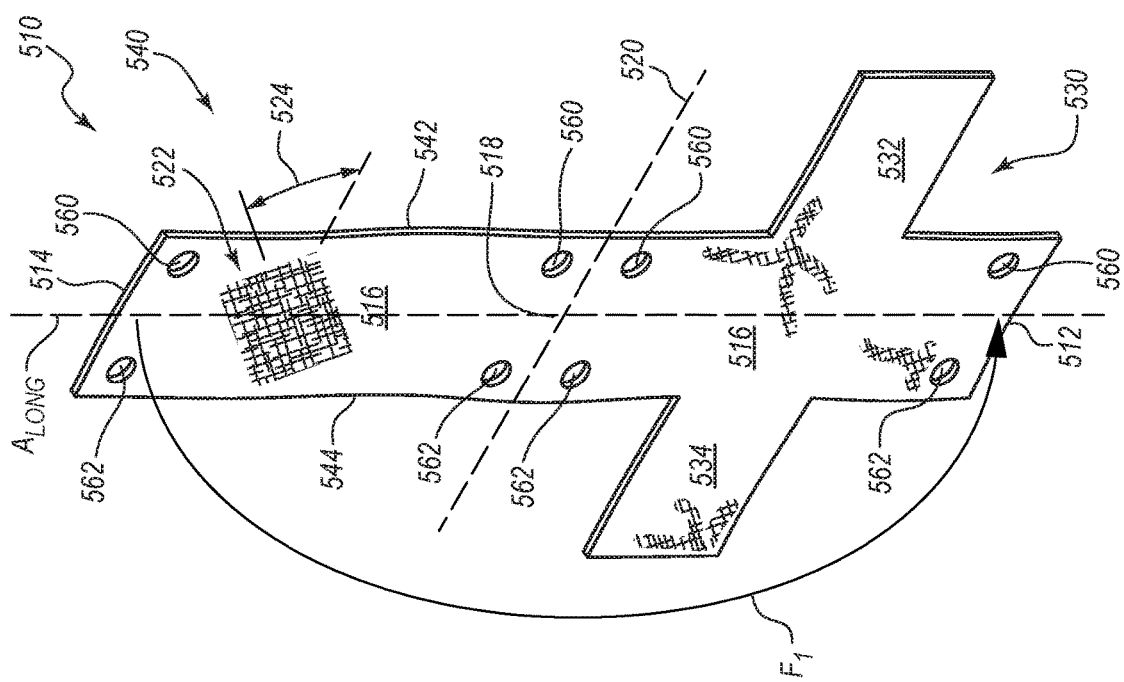
FIG. 5B
FIG. 5A

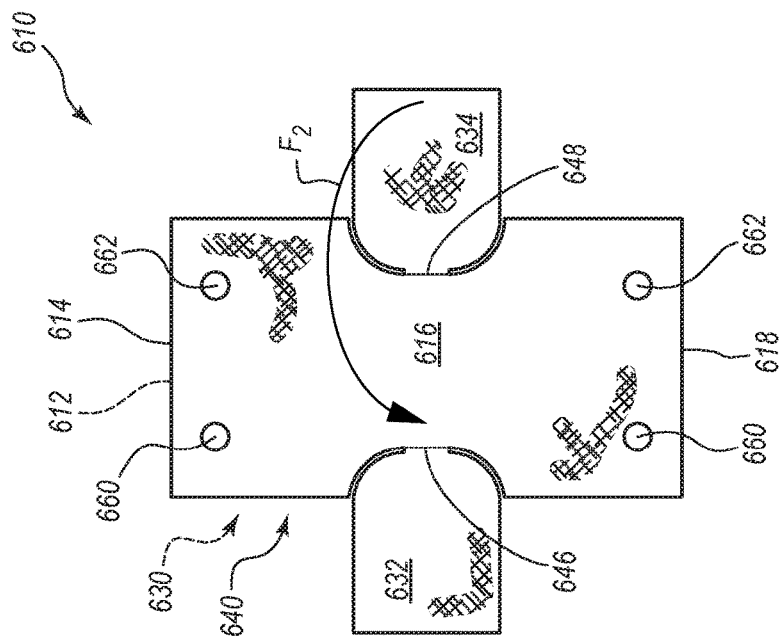
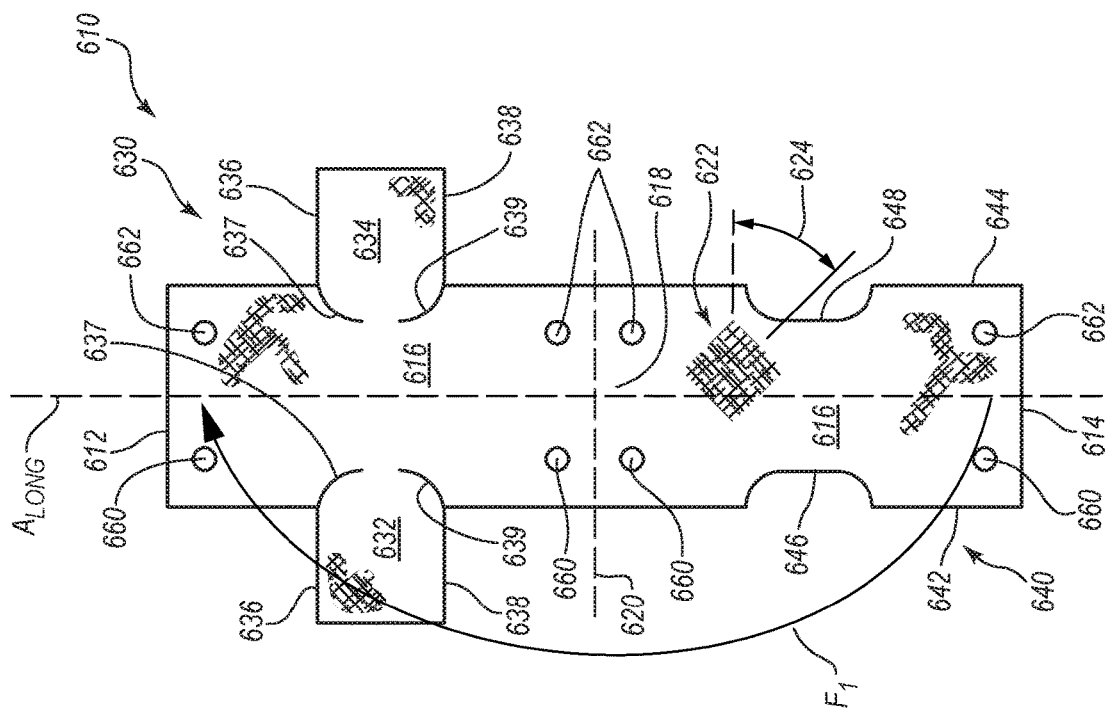

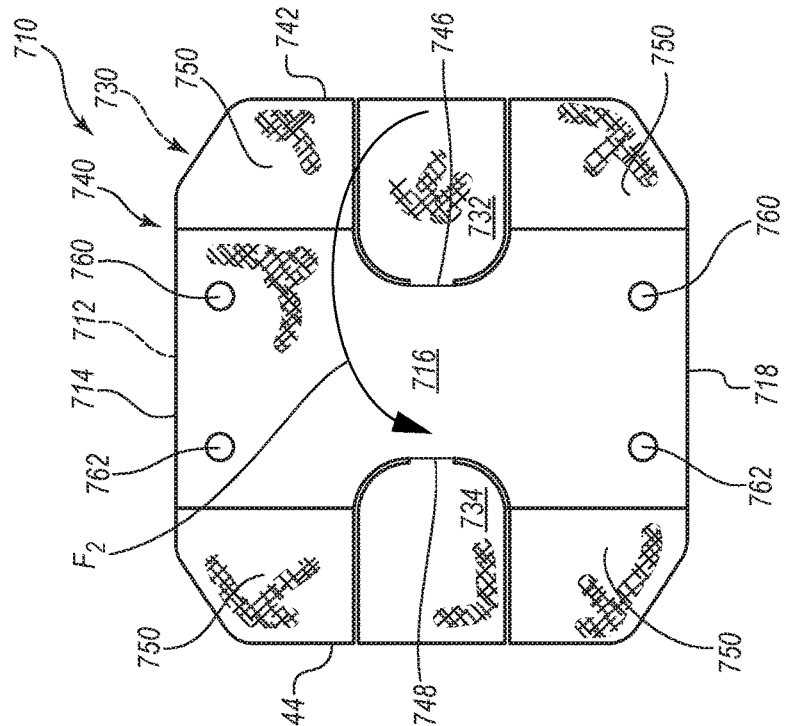
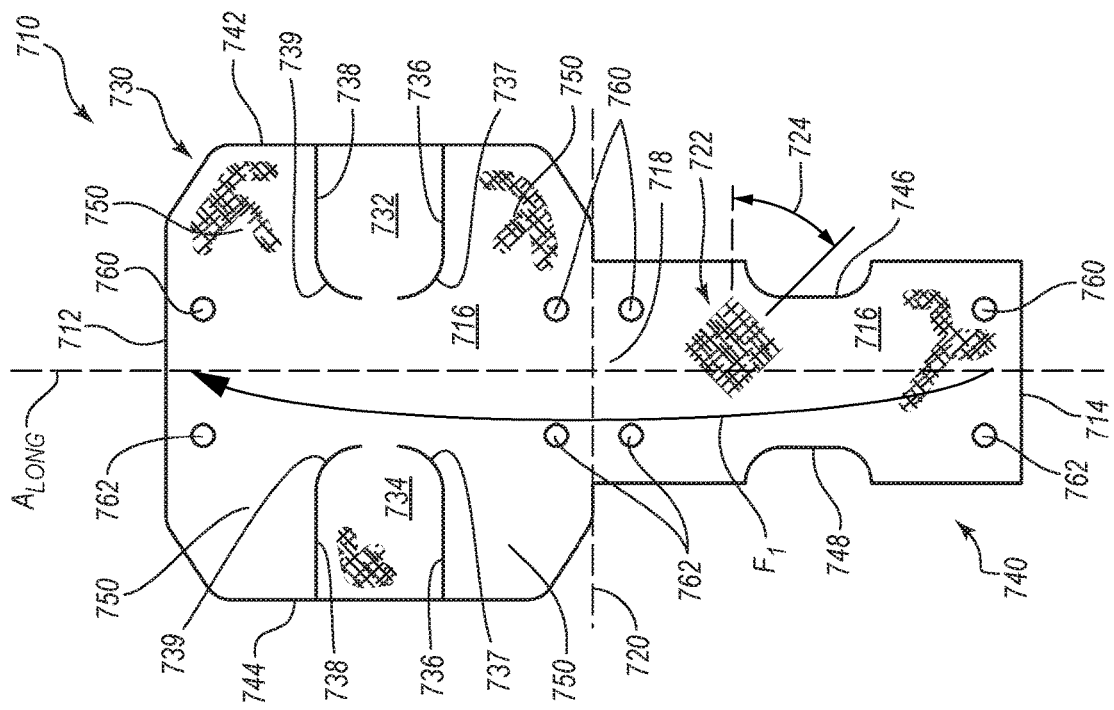
FIG. 7B
FIG. 7A

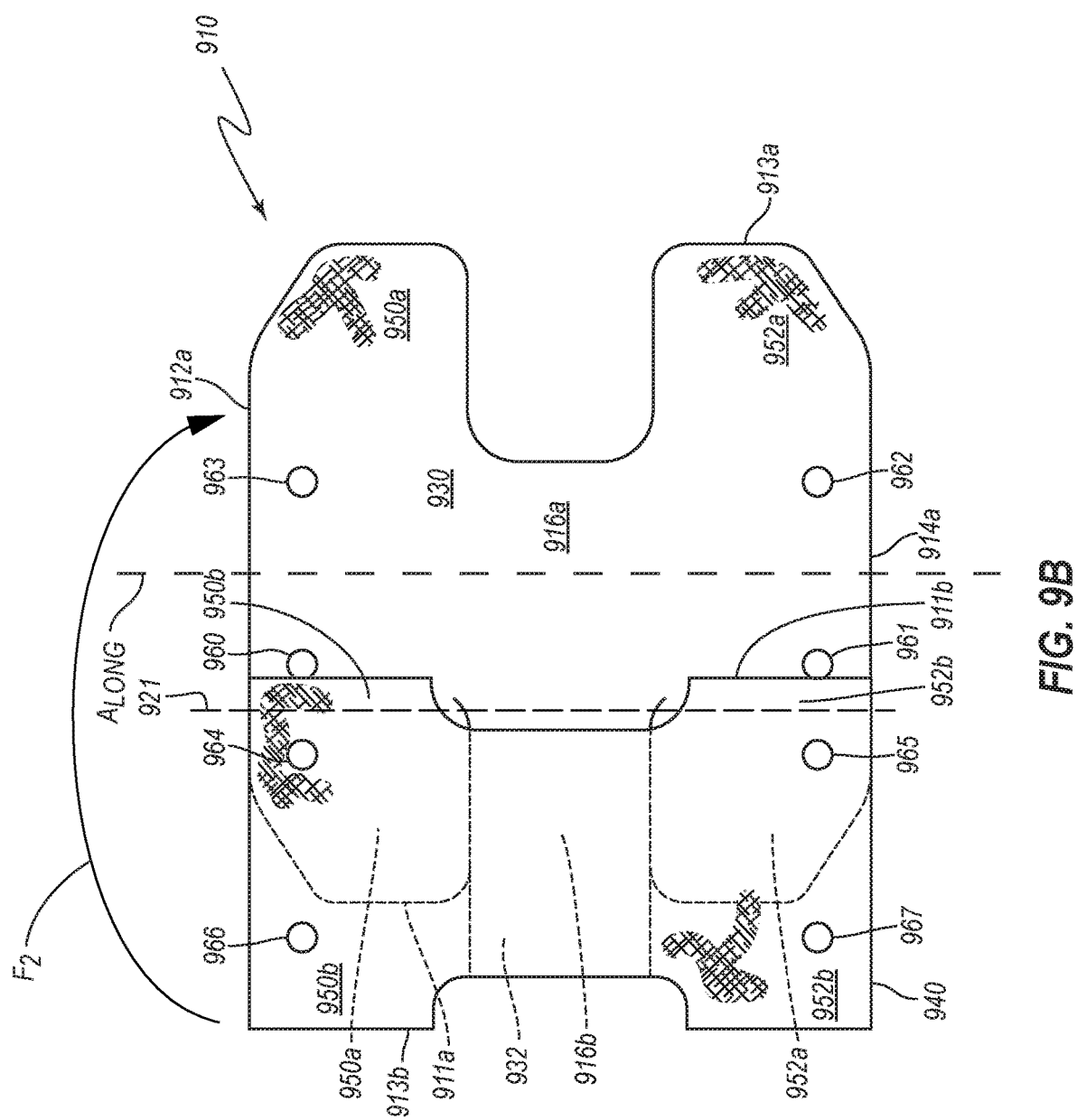

MOUNTING TAB ASSEMBLIES FOR SECURING AN AIRBAG TO A VEHICLE

RELATED APPLICATIONS

This application is a continuation-in-part of U.S. Nonprovisional patent application Ser. No. 15/890,190, filed Feb. 6, 2018, and titled "Mounting Tab Assemblies for Securing an Airbag to a Vehicle," which is hereby incorporated herein by reference in its entirety.

TECHNICAL FIELD

The present disclosure relates generally to the field of automotive protective systems. More specifically, the present disclosure relates to airbag systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

FIG. 3A is a partial cross-sectional view through line 3-3 of the mounting tab assembly of FIG. 2.

FIG. 3B is a partial cross-sectional view of a mounting tab assembly, according to another embodiment of the present disclosure.

FIG. 4B is a perspective view of the tab of FIG. 4A with the tab having been folded along the fold axis.

FIG. 4C is a perspective view of the tab of FIG. 4A after a second fold has been made.

FIG. 4D is a perspective view of the tab of FIG. 4A after a third fold has been made.

FIG. 4E is a perspective view of the tab of FIG. 4A after three folds have been made.

FIG. 5A is a perspective view of a tab, according to another embodiment of the present disclosure, in a preassembled state.

FIG. 5B is an overhead plan view of the tab of FIG. 5A with a first fold completed.

FIG. 6A is an overhead plan view of a tab, according to another embodiment of the present disclosure, in a preassembled state.

FIG. 6B is a top plan view of the tab of FIG. 6A with a first fold completed.

FIG. 7A is a top plan view of a tab, according to another embodiment of the present disclosure, in a preassembled state.

FIG. 7B is a top plan view of the tab of FIG. 7A with a first fold completed.

FIG. 9B is a top plan view of the tab of FIG. 9A with a first fold or roll complete.

DETAILED DESCRIPTION

Figure 1A:
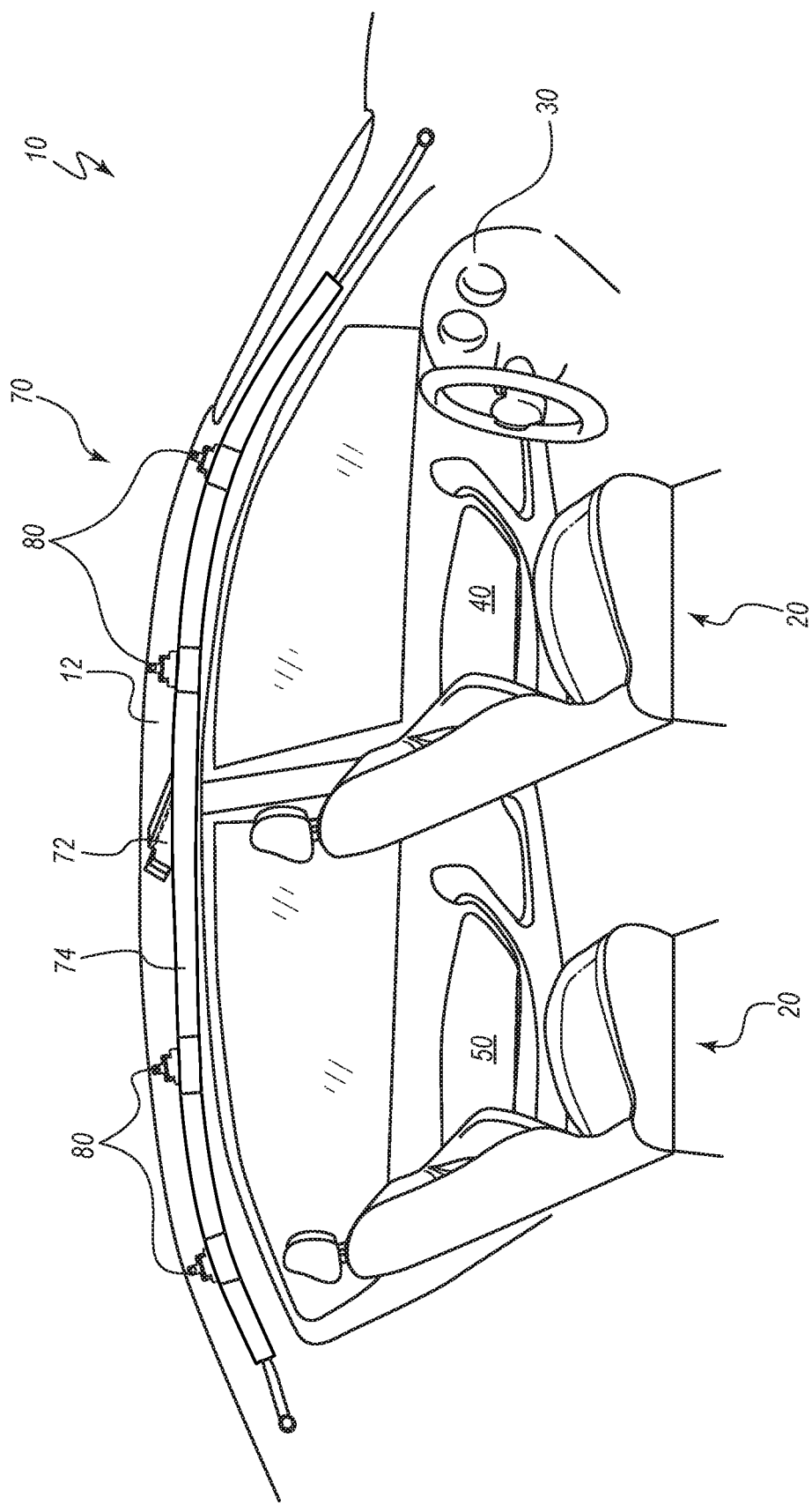
FIG. 1A is a side view of an interior of a vehicle having an inflatable side air curtain assembly, according to one embodiment of the present disclosure, the side air curtain assembly coupled to the roof of the vehicle by one or more brackets.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable airbag that deploys from an overhead position (or from a position generally over a vehicle occupant position) to protect an occupant during a collision event. An airbag assembly may be mounted to a vehicle using one or more mounting tab assemblies. The disclosed mounting tab assemblies and tab embodiments may be utilized in conjunction with airbags, such as, for example, a front passenger airbag that is typically housed within the dashboard, driver airbags housed within the steering wheel, knee airbags, and side airbags. The disclosed mounting tab assemblies may also be used in conjunction with one or more of the rear seats of a vehicle (e.g., in an overhead position such as in a seat- or roof-mounted configuration). Further, the disclosed mounting tab assemblies may be used in an autonomous vehicle (e.g., in a vehicle that may not have a steering wheel and/or that may have limited, or no, reaction surface such as an instrument panel).

As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present.

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

During installation, airbags are typically disposed at an interior of a housing in a packaged state (e.g., are rolled, folded, and/or otherwise compressed) or a compact configuration and may be retained in the packaged state behind a cover. The disclosed mounting tab assemblies may reduce the volume of an airbag assembly when compacted and packaged for installation to a vehicle. During a collision event, an inflator is triggered, which rapidly fills the airbag with inflation gas. The airbag can rapidly transition from a packaged state (e.g., a compact configuration) to a deployed state or an expanded configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Some embodiments of mounting tab assemblies that are disclosed herein are configured for airbag assemblies intended to cushion a front-seat passenger, and may be mounted in a roof of a vehicle, or in a structure above an occupant seating position, or within a seat-back portion of an occupant seat. An airbag assembly can mitigate injury to an occupant of a vehicle during a collision event by reducing the effect of impact of the occupant against structures (body-structure impact) within the vehicle (such as, e.g., a dashboard or door column). The disclosed mounting tab assemblies assist in injury mitigation by disposing and positioning airbag assemblies during a collision event, and by transferring at least some of the energies generated by an occupant impact on an airbag cushion to the vehicle.

Some embodiments disclosed herein can provide improved positioning, cushioning, and/or safety to occupants involved in particular types of collisions. For example, some embodiments can be configured to cushion a vehicle driver and/or front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap front crash test and the NHTSA oblique impact test are disclosed in the Insurance Institute for Highway Safety, Small Overlap Frontal Crashworthiness Evaluation Crash Test Protocol (Version II) (December 2012); and Saunders, J., Craig, M., and Parent, D., Moving Deformable Barrier Test Procedure for Evaluating Small Overlap/Oblique Crashes, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

FIG. 1A is a side view of an interior of a vehicle 10 equipped with an inflatable side air curtain assembly 70, the side air curtain assembly 70 coupled to a roof 12 of the vehicle 10 by one or more brackets 80. Although the side air curtain assembly 70 is shown, embodiments of the disclosure herein may be suitable for other types of airbag assemblies. Shown for reference are two vehicle occupant positions 20, an instrument panel 30, a front door 40, and a rear door 50. FIG. 1A depicts the vehicle 10 having at least four vehicle occupant positions 20 and four doors 40, 50; however, the embodiments disclosed herein may be suitable for other vehicle configurations.

The inflatable side air curtain assembly 70 can include an inflator 72 and an inflatable airbag curtain 74. The side air curtain assembly 70 can be coupled to the roof 12 of the vehicle 10 by one or more brackets 80. In some embodiments, the brackets 80 may aid in disposing the side air curtain assembly 70 in a compactly packaged stored configuration.

Figure 1B:
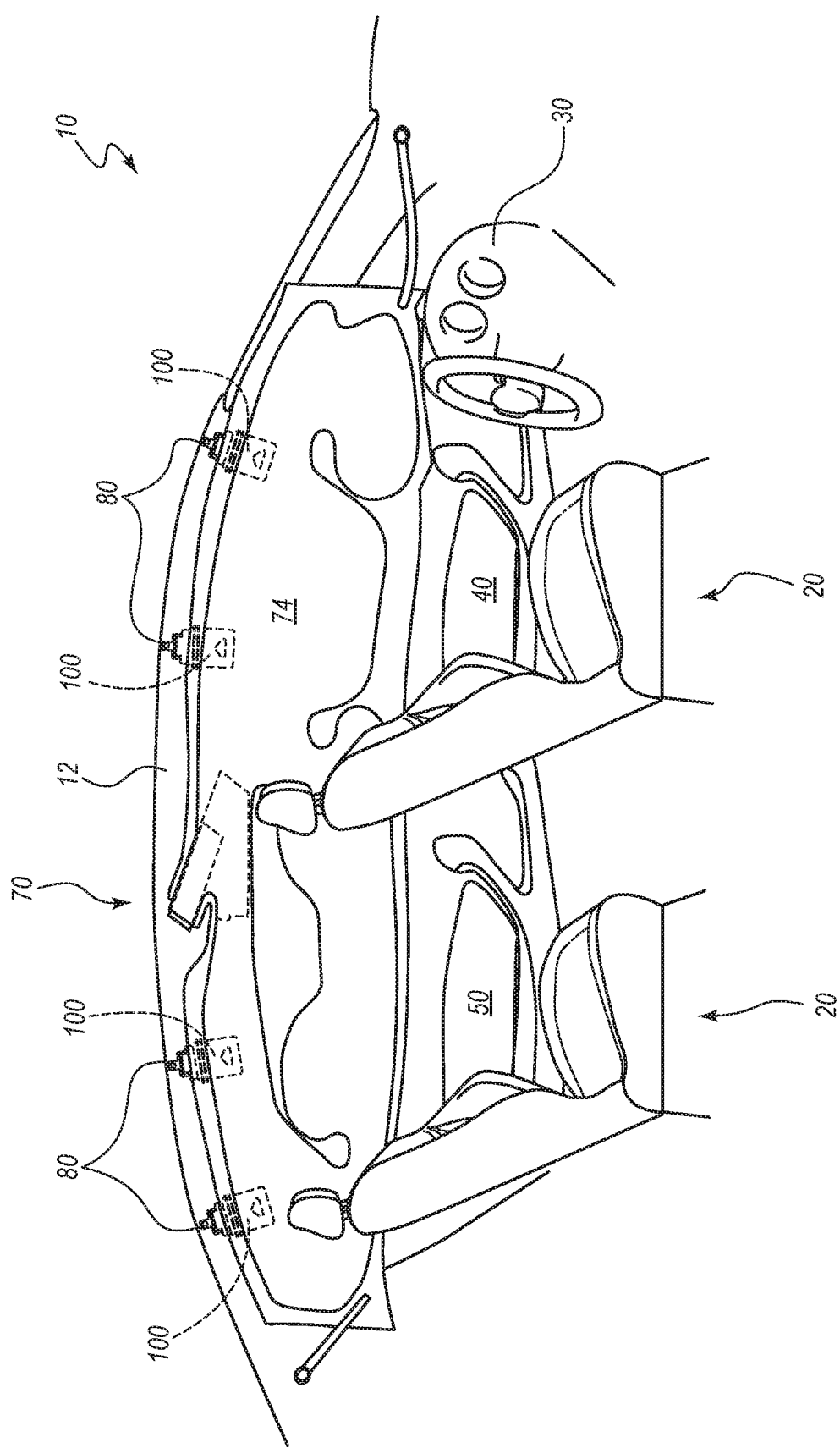
FIG. 1B is a side view of the inflatable side air curtain assembly of FIG. 1A in a deployed state.

FIG. 1B is a side view of the interior of the vehicle 10 having the inflatable side air curtain assembly 70 and brackets 80 of FIG. 1A, with the inflatable airbag curtain 74 in a deployed state. The vehicle occupant positions 20, instrument panel 30, front door 40, and rear door 50 are shown for reference. The brackets 80 can couple the side air curtain assembly 70 to at least a portion of the roof 12 of the vehicle 10. Each bracket 80 can include a mounting tab assembly 100. Each mounting tab assembly 100 can be coupled to a portion of the side air curtain assembly 70 or inflatable airbag curtain 74 and the respective bracket 80. The brackets 80 and mounting tab assemblies 100 may assist to dispose and configure the side air curtain assembly 70 and/or the inflatable airbag curtain 74 during a collision event. Moreover, an airbag (such as the inflatable airbag curtain 74) can be coupled or secured to a vehicle via a mounting tab assembly as provided herein (such as the mounting tab assembly 100).

Figure 2:
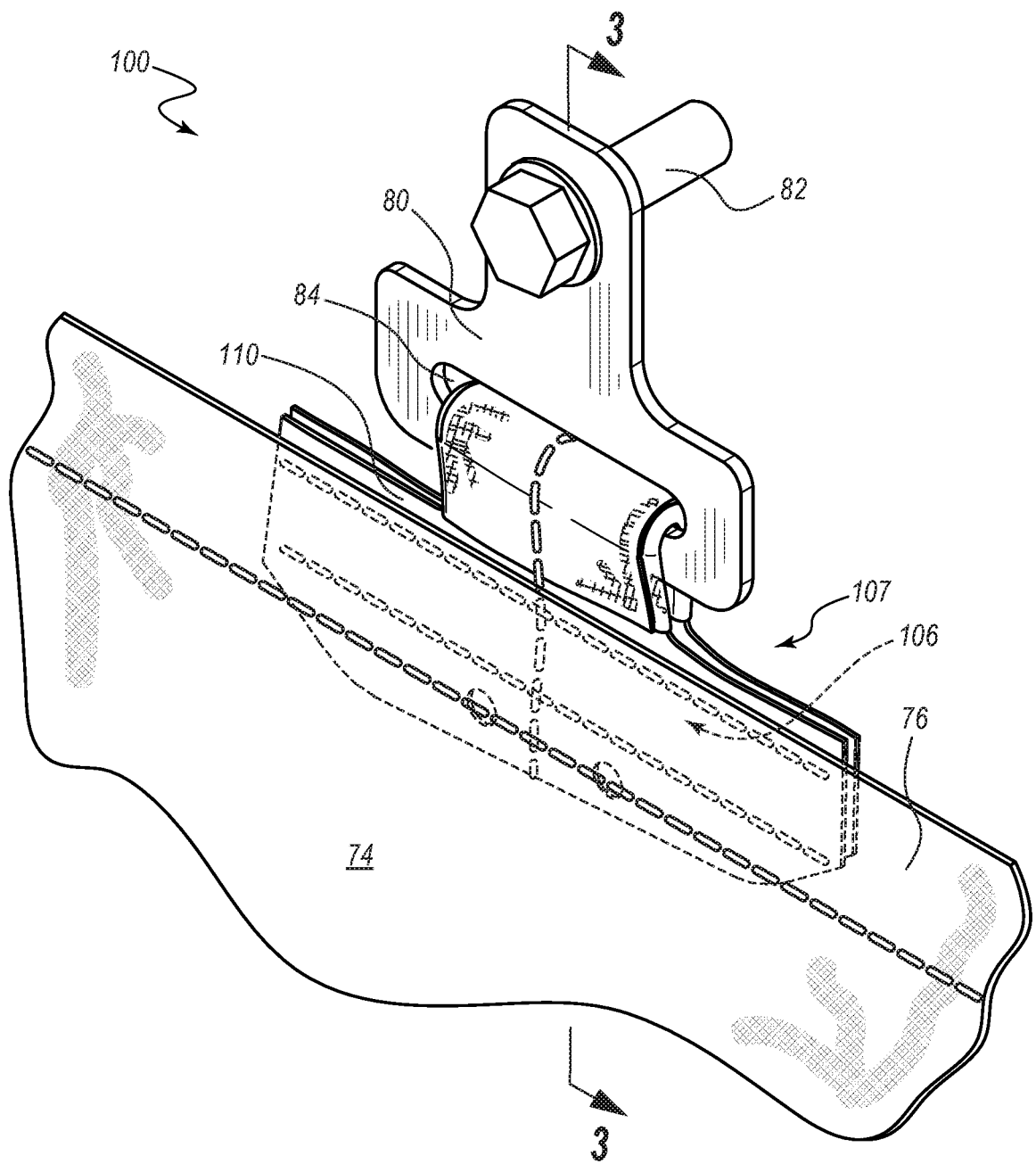
FIG. 2 is a perspective view of a mounting tab assembly, according to an embodiment of the present disclosure, with the mounting tab assembly coupled to an edge of an inflatable side airbag curtain.

FIG. 2 is a perspective view of the mounting tab assembly 100 with the mounting tab assembly 100 coupled to an edge 76 of the airbag curtain 74. The bracket 80 and a mounting bolt 82 are also shown. The bracket mounting bolt 82 may serve to couple the bracket 80 to the vehicle 10. The bracket 80 can include an aperture 84. A tab 110 of the mounting tab assembly 100 can loop through the aperture 84 of the bracket 80 and be coupled to the edge 76 of the airbag curtain 74. As shown, the tab 110 can include a first portion 106 and a second portion 107.

The mounting tab assembly 100 may reduce the volume of an airbag assembly when compacted and packaged for installation to a vehicle. More specifically, the tab 110 is configured to minimize or otherwise reduce the amount or quantity of material at a coupling point with the edge 76 of the airbag curtain 74, while providing ample material adjacent to and/or in contact with the bracket 80 to provide adequate reinforcement, for example to limit tearing, fraying, damage, or the like to the tab 110 by friction with the bracket 80 or any sharp or rough edges or surfaces on the bracket 80.

In FIG. 2, the tab 110 is positioned through the aperture 84 and folded according to a first orientation. As can be appreciated, in other embodiments the tab 110 may be positioned through the aperture 84 in an opposite orientation (e.g., rotated 180 degrees about an axis extending through the aperture 84) from that shown and then folded to couple to the edge 76 of the airbag curtain 74 in the manner shown.

FIG. 3A is a partial cross-sectional view of the bracket 80 and mounting tab assembly 100 of FIG. 2 through line 3-3. The mounting tab assembly 100 can include the tab 110, a bracket receiving member 104, and an airbag coupling member 108. The tab 110 can loop or pass through the aperture 84 of the bracket 80. The bracket receiving member 104 of the tab 110 can couple the tab 110 to the bracket 80 (e.g., at the aperture 84). The airbag coupling member 108 couples at least a portion of the tab 110 to the edge 76 of the airbag curtain 74. More particularly, the first portion 106 and the second portion 107 can be coupled to a first side of the edge 76 of the airbag curtain 74. In various embodiments, the first portion 106 of the tab 110 can be coupled to a first side of the edge 76 of the airbag curtain 74, and the second portion 107 of the tab 110 can be coupled to a second side (e.g., an opposite side) of the edge 76 of the airbag curtain 74.

The tab 110, bracket receiving member 104, and airbag coupling member 108 can be formed from a single panel of material (as described in more detail below), which is folded and coupled to itself so as to form multiple layers of material. In some embodiments, the material may include a fabric, a polymer, or another suitable material. The panels as illustrated herein are generally depicted as being formed from a fabric. Panels that are formed from other suitable materials are also within the scope of this disclosure. The panel may be coupled to itself by sewing, adhesive, welding (e.g., radio frequency welding), taping, or any other suitable means. The airbag coupling member 108, in the embodiment of FIG. 3A, can include four layers of fabric and may be coupled to the edge 76 of the airbag curtain 74. The four layers of fabric of the airbag coupling member 108 may provide a flexible coupling of the airbag curtain 74 to a vehicle so as to dispose and configure the side air curtain assembly 70 during a collision event.

The bracket 80 may be formed of metal or any other generally rigid material suitable for coupling the side air curtain assembly 70 to the vehicle. The bracket receiving member 104 of the tab 110, in the embodiment of FIG. 3A, can include four layers of fabric of the tab 110 looped through the aperture 84 of the bracket 80. The bracket receiving member 104 couples the tab 110 between the rigid bracket 80 and the airbag curtain 74. The airbag curtain 74 may move or flex in response to various forces during a collision event (e.g., in response to receiving a vehicle occupant). The movement of the airbag curtain 74 and the mounting tab assembly 100 can require a durable and resilient coupling between the airbag curtain 74 and the bracket 80. The four-layer configuration of the bracket receiving member 104 may provide a durable and resilient coupling between the rigid bracket 80 and the airbag curtain 74 so as to dispose and configure the side air curtain assembly 70 during a collision event.

With continued reference to FIG. 3A, the layers of the tab 110 are shown having a first panel (or zone) 130 adjacent to the edge 76 of the airbag curtain 74, then a second panel (or zone) 140, then a first arm (or protrusion) 132, and then a second arm (or protrusion) 134. These components are further described below.

FIG. 3B is a partial cross-sectional view of the bracket 80 and a mounting tab assembly 100' having an alternative order of layers in a tab 110'. Stated differently, the tab 110' of FIG. 3B may be disposed through the aperture 84 in an opposite orientation (e.g., rotated 180 degrees about an axis extending through the aperture 84) from that shown in FIG. 3A before being folded down to couple to the edge 76 of the airbag curtain 74. In the embodiment of FIG. 3B, a first arm 132' is adjacent to a second panel 140' medially, or inwardly opposite from, a first panel 130', with a second arm 134' disposed adjacent to the first arm 132'. Tabs analogous to the tabs 110, 110' that are formed by yet other layer orders than those shown in FIGS. 3A and 3B are also within the scope of this disclosure.

As can be seen in FIGS. 3A and 3B, the tabs 110, 110' may reduce the volume of an airbag assembly when compacted and packaged for installation to a vehicle. More specifically, the tabs 110, 110' are configured to minimize or otherwise reduce the amount or quantity of material at a coupling point with the airbag curtain 74 (e.g., to allow a tighter roll or otherwise more compressed state of the airbag curtain 74), while providing more material adjacent to and/or in contact with the metal bracket 80 to provide adequate reinforcement, for example to limit tearing, fraying, damage, or the like to the tab 110, 110' as a result of friction with the bracket 80 or any sharp or rough edges or surfaces on the bracket 80.

Figure 4A:
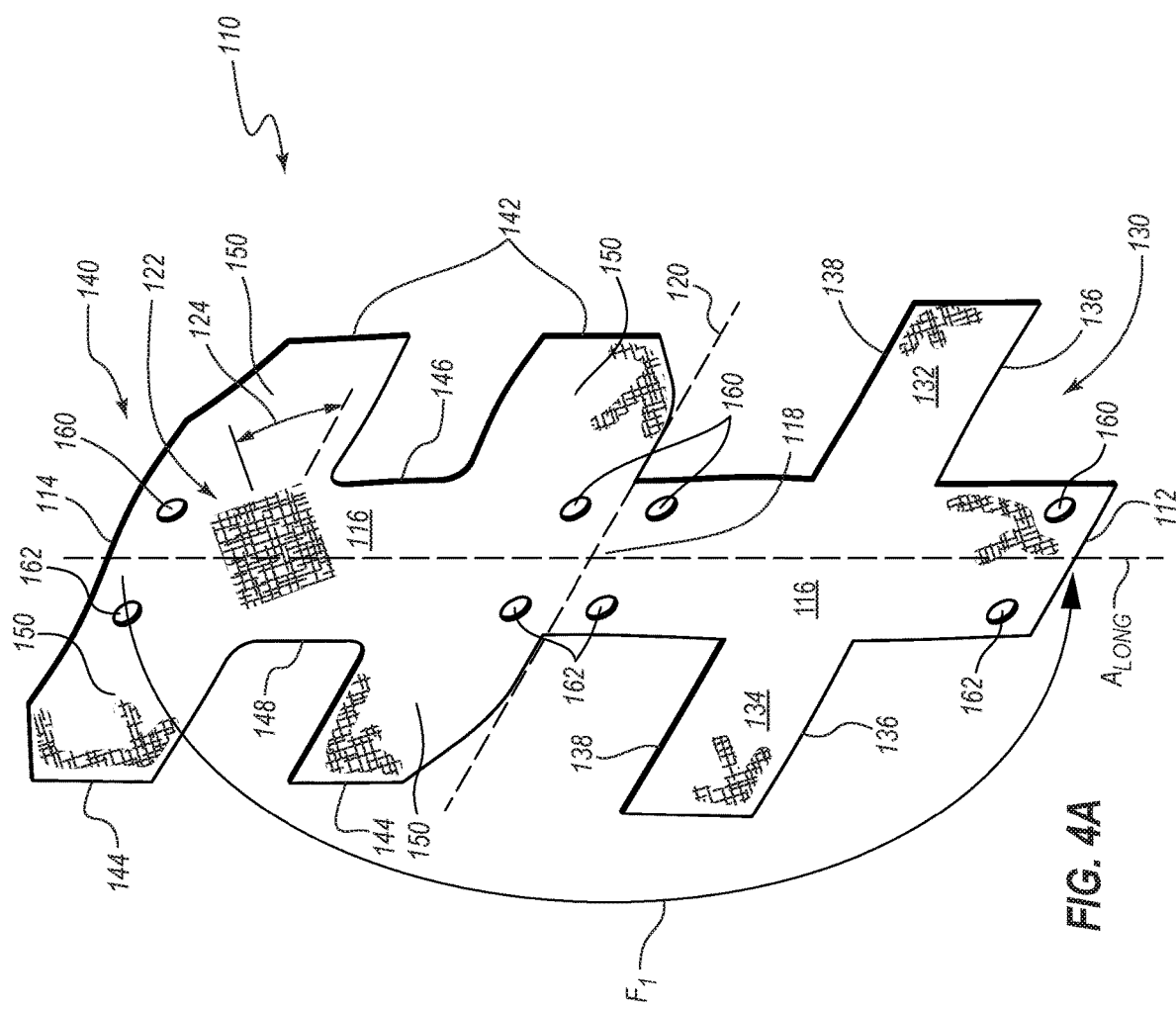
FIG. 4A is a perspective view of the unassembled tab of the mounting tab assembly of FIG. 3A or 3B.

FIG. 4A is a perspective view of an unassembled tab 110 of the mounting tab assembly 100 of FIG. 2, wherein the tab 110 has been cut or otherwise formed so as to be configured for assembly. The tab 110 of FIG. 4A is analogous to the tab 110'. Accordingly, the components and/or portions of the tab 110 may also be present in the tab 110'. For example, wherein the tab 110 can include a first panel 130, the following description and corresponding figures (e.g., FIGS. 4A-4E) may be read to indicate that the tab 110' also includes a first panel 130'. For clarity, only the numbering for the tab 110 will be used in the following description and corresponding figures.

In the embodiment of FIG. 4A, the tab 110 can include a first panel 130 extending from a first end 112 toward a second end 114 of the tab 110, and a second panel 140 extending from the second end 114 of the tab 110 toward the first panel 130, wherein the second panel 140 meets the first panel 130 at a foldable portion 118. For example, the foldable portion 118 may be disposed at a junction of the first and second panels 130, 140. Furthermore, a first arm 132 extends away from a central portion 116 of the first panel 130 in a first direction, and a second arm 134 extends away from the central portion 116 of the first panel 130 in a second direction opposite to the first direction and transverse or orthogonal to a longitudinal axis $A_{LONG}$. A first recess 146 extends inward from a first lateral edge 142 of the second panel 140, and a second recess 148 extends inward from a second lateral edge 144 of the second panel 140. The longitudinal axis $A_{LONG}$ is longitudinal to the tab 110 itself and not to the vehicle or any vehicle structure. The first panel 130, as illustrated, may substantially be the shape of a plus sign (+).

The tab 110 can be configured to be folded at the foldable portion 118 near a midline (fold axis 120) of the tab 110 transverse to the longitudinal axis $A_{LONG}$, such that the first end 112 is disposed adjacent the second end 114, wherein the first arm 132 and the second arm 134 are configured to fold through the first recess 146 and second recess 148, respectively, and around at least a portion of a central portion 116 of the second panel 140 to form the bracket receiving member 104. The fold axis 120 and the longitudinal axis $A_{LONG}$ are substantially perpendicular to one another.

In other words, each of the first and second panels 130, 140 includes a central portion 116, which may be a single central portion 116 which extends longitudinally along the tab 110 and through the foldable portion 118. The first panel 130 can include a pair of arms 132, 134, which extend in opposite directions from the central portion 116 of the first panel 130. Each of the first and second arms 132, 134 can include a first cut 136 along a first edge and a second cut 138 along a second edge. Each arm 132, 134 may be defined by the first cut 136 and the second cut 138. The dimension of each arm 132, 134 longitudinally, relative to the tab 110, is similar to the longitudinal dimension of each respective recess 146, 148. The second panel 140 can be substantially as wide laterally as are the arms 132, 134 of the first panel 130 and can include a pair of recesses 146, 148, which extend from the lateral edges 142, 144, respectively, inward toward the central portion 116 of the second panel 140.

The configuration of the recesses 146, 148 of the second panel 140 can form four wings 150, with two wings 150 disposed to either side of each recess 146, 148. Stated another way, each of the first and second recesses 146, 148 is disposed between two wings 150, and each of the wings 150 extends away from the central portion 116 of the second panel 140. The tab 110 is folded (as indicated by arrow $F_1$) along the fold axis 120 such that the first end 112 and second end 114 are adjacent each other, and the central portions 116 of the first panel 130 and second panel 140 substantially overlie each other.

Each panel 130, 140 may include one or more first apertures 160, and one or more second apertures 162, with the second apertures 162 laterally offset from the first apertures 160. The apertures 160, 162 may assist in assembly of the tab 110 by permitting or causing correct alignment of the first panel 130 and second panel 140 (e.g., when folded at or adjacent the fold axis 120). That is, aligning the first apertures 160 of the second panel 140 with the first apertures 160 of the first panel 130, and similarly aligning the second apertures 162 of the first and second panels 130, 140, may ensure that the first and second panels 130, 140 are properly aligned during assembly. Proper alignment of the panels 130, 140, when folded, may assist in achieving a desirable volume of the compacted, packaged inflatable side air curtain assembly 70, as well as ensuring a desired strength (e.g., resistance to failure) of the mounting tab assembly 100.

The tab 110 may be formed from a single unitary fabric panel, including the first and second panels 130, 140. The tab 110 may be formed from the fabric panel such that the bias or weave 122 of the fabric is at an angle 124 relative to the longitudinal axis $A_{LONG}$. In the embodiment of FIG. 4A, the angle 124 of the bias 122 is disposed at about forty-five degrees (45°) relative to the longitudinal axis $A_{LONG}$, and to the fold axis 120. In various embodiments, the bias angle of the fabric panel to the longitudinal axis $A_{LONG}$ may be between about 15° and about 75°, between about 30° and about 60°, or between about 40° and about 50°. Other suitable bias angles 124 are also within the scope of this disclosure. The bias angle 124 may strengthen and/or reinforce the tab 110. For example, the bias angle 124 may strengthen and/or reinforce the tab 110 at the bracket receiving member 104. In other words, the bias angle 124 may aid in dissipating one or more forces transferred from the airbag curtain 74 to the bracket 80, and the bias angle 124 prevents or limits potential failure of the tab 110.

FIG. 4B is a perspective view of the tab 110 of FIG. 4A, with the tab 110 having been folded along the fold axis 120. With the first fold $F_1$ completed, the first end 112 and second end 114 are substantially disposed adjacent each other, as are the central portions 116 of the first panel 130 and second panel 140. The foldable portion 118 is disposed opposite (e.g., longitudinally) the first and second ends 112, 114. The first and second apertures 160, 162 of the first panel 130 substantially align with the corresponding first and second apertures 160, 162 of the second panel 140. The first arm 132 of the first panel 130 substantially aligns with the first recess 146 of the second panel 140. The shape of the first arm 132 substantially corresponds to the shape of the first recess 146, and the shape of the second arm 134 substantially corresponds to the shape of the second recess 148. In other words, the first arm 132 is the same size and shape, or substantially the same size and shape, as the first recess 146. The second arm 134, likewise, is the same size and shape as the second recess 148, or substantially the same size and shape as the second recess 148. The second arm 134 of the first panel 130 substantially aligns with the second recess 148 of the second panel 140. A second fold axis 122a is shown parallel to the longitudinal axis $A_{LONG}$ and positioned at or near the medial extent of the first recess 146. The first arm 132 is folded $F_2$ along the second fold axis 122a toward and onto at least a portion of the central portion 116 of the second panel 140.

FIG. 4C is a perspective view of the tab 110 of FIG. 4A after the second fold $F_2$ has been made. The first arm 132 of the first panel 130 overlies at least a portion of the central portion 116 of the second panel 140. A third fold axis 122b is shown substantially parallel to the longitudinal axis $A_{LONG}$ and positioned at or near the medial extent of the second recess 148 of the second panel 140. The second arm 134 of the first panel 130 is folded (see arrow $F_3$) toward and over at least a portion of the central portion 116 of the second panel 140 and onto at least a portion of the first arm 132.

FIG. 4D is a perspective view of the tab 110 of FIG. 4A after the third fold $F_3$ has been made. In some embodiments, along with each of the three folds $F_1$, $F_2$, $F_3$, a suitable adhesive may be applied to couple the second panel 140 to the first panel 130 and to couple the first arm 132 to the central portion 116 of the second panel 140 and/or to couple the second arm 134 to the first arm 132. Such adhesive, if applied, may be applied to the entire coupling surface of either or each component, or may be applied only in the area of the bracket receiving member 104.

FIG. 4E is another perspective view of the tab 110 of FIG. 4A after the three folds $F_1$, $F_2$, $F_3$ have been completed. A stitch or series of stitches 170 may extend along at least a portion of the tab 110 when the tab 110 is in a folded configuration. For example, the stitches 170 may extend along at least a portion of the bracket receiving member 104. In other words, a line of stitches 170 may be applied along or near the longitudinal axis $A_{LONG}$ to strengthen and/or couple together each of the fabric layers including the bracket receiving member 104. Once assembled, the tab 110 can include the bracket receiving member 104. The bracket receiving member 104 of the tab 110 can be disposed through the aperture 84 of a bracket 80 that is to be mounted or coupled to a vehicle structure to secure the tab 110 to the vehicle, and the first panel 130 and second panel 140 can be configured to be coupled to an airbag (not shown) to couple the airbag to the vehicle.

With the folds $F_1$, $F_2$, $F_3$ completed, the bracket receiving member 104 may include four layers of material to be disposed through an aperture of a bracket such that eight layers of material are disposed at the bracket receiving member 104 when the tab 110 is in a folded configuration. In other words, when the tab 110 is passed through the aperture of the bracket and folded so that the first and second panels 130, 140 are coupled to the airbag, the bracket receiving member 104 disposes eight layers of material at the aperture of the bracket.

Portions of the first and second panels 130, 140 at or adjacent to the foldable portion 118 may form the first portion 106 of the airbag coupling member (see the airbag coupling member 108 of FIG. 3A), while portions of the first and second panels 130, 140 at or adjacent to the first and second ends 112, 114, respectively, may form a second portion 107 of the airbag coupling member 108. The first and second portions 106, 107 of the airbag coupling member 108 are disposed adjacent each other when the tab 110 is in a folded configuration forming the airbag coupling member 108. This configuration disposes four layers of material at a central portion 116 of the airbag coupling member 108 (analogous to the central portion 116 of the first and second panels 130, 140), and the first aperture 160 extends through each of the four layers of material at the central portion 116. Similarly, the second aperture 162 extends through each of the four layers of material at the central portion 116. In other words, with the tab 110 folded, all four of the first apertures 160 can substantially align to form a contiguous first aperture 160 through all four layers of material, and all four of the second apertures 162 can substantially align to form a contiguous second aperture 162 through all four layers of material.

The tab 110 can form a two-layer thickness at the first and second portions 106, 107 of the airbag coupling member 108. The tab 110 also forms a four-layer thickness at the bracket receiving member 104. The two-layer thickness at the first and second portions 106, 107, and the four-layer thickness at the bracket receiving member 104 can provide greater resistance to tearing, rupturing, or failure under one or more forces that may be applied to the tab 110 during a collision event, as compared to mounting tabs having fewer layers, while providing for greater compaction of an inflatable airbag system into which the tab 110 may be incorporated (e.g., when the inflatable airbag is in a packaged state).

FIGS. 5A-5D depict an embodiment of a tab 510 that resembles the tab 110 described above in certain respects. Accordingly, like features are designated with like reference numerals, with the leading digits incremented to "5." For example, the embodiment depicted in FIG. 5A includes a first panel 530 that may, in some respects, resemble the first panel 130 of FIGS. 3A-4E. Relevant disclosure set forth above regarding similarly identified features thus may not be repeated hereafter. Moreover, specific features of the tab 110 and related components shown in FIGS. 3A-4E may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the tab 510 and related components depicted in FIGS. 5A-5D. Any suitable combination of the features, and variations of the same, described with respect to the tab 110 and related components illustrated in FIGS. 3A-4E can be employed with the tab 510 and related components of FIGS. 5A-5D, and vice versa. This pattern of disclosure applies equally to further embodiments depicted in subsequent figures and described hereafter, wherein the leading digits may be further incremented.

FIG. 5A is a perspective view of the tab 510 in a preassembled state. The tab 510 can include the first panel 530 and a second panel 540. The first panel 530 can extend from a first end 512 of the tab 510 toward a second end 514 of the tab 510. The first panel 530 can include a central portion 516, a first arm 532, and a second arm 534. The first panel 530 can also include one or more first apertures 560 and one or more second apertures 562.

The second panel 540 of the tab 510 can extend from the second end 514 toward the first end 512 and to a foldable portion 518 where it meets the first panel 530. The second panel 540 can include a central portion 516, a first lateral edge 542, and a second lateral edge 544. The second panel 540 can be substantially as wide as the central portion 516. The second panel 540 may include one or more first apertures 560 and one or more second apertures 562.

The tab 510 may be formed from a material (e.g., a fabric material). The fabric material can include a bias or weave 522. As shown in FIG. 5A, the angle 524 of the bias 522 may be about 45° relative to the longitudinal axis $A_{LONG}$ and relative to the fold axis 520. In other embodiments, the angle 524 of the bias 522 may be another suitable angle.

The tab 510 may be folded $F_1$ at the foldable portion 518 along the fold axis 520 so that the second panel 540 is substantially adjacent to and lies against at least a portion of the first panel 530, with the second end 514 substantially adjacent to the first end 512. With the tab 510 folded along the fold axis 520, the first apertures 560 of the first panel 530 and of the second panel 540 may be substantially aligned to each other. Similarly, the second apertures 562 of the first panel 530 may be substantially aligned with the second apertures 562 of the second panel 540.

FIG. 5B is an overhead plan view of the tab 510 of FIG. 5A with the first fold $F_1$ completed. As shown, the second panel 540 can substantially overlie the first panel 530. The first arm 532 of the first panel 530 can extend beyond the first lateral edge 542 of the second panel 540. The second arm 534 of the first panel 530 can extend beyond the second lateral edge 544 of the second panel 540. The second arm 534 can be folded (see arrow $F_2$) along the second lateral edge 544 toward and onto at least a portion of the central portion 516 of the second panel 540.

Figure 5D:
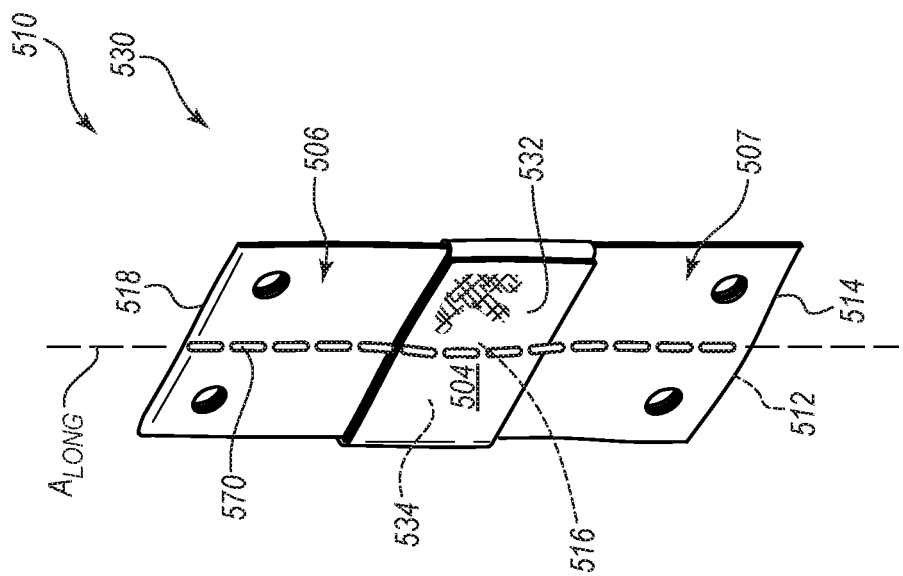
FIG. 5D is a perspective view of the tab of FIG. 5A with three folds completed.
Figure 5C:
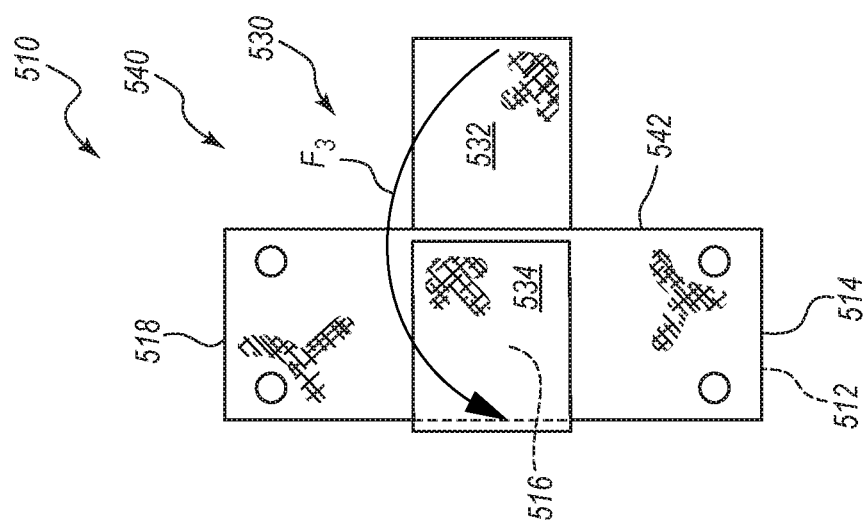
FIG. 5C is an overhead plan view of the tab of FIG. 5A with a second fold completed.

FIG. 5C is an overhead plan view of the tab 510, with the first and second folds $F_1$, $F_2$ completed. As illustrated, the second panel 540 can overlie at least a portion of the first panel 530. The second arm 534 can overlie at least a portion of the central portion 516 of the second panel 540. The first arm 532 can be folded (see arrow $F_3$) along the first lateral edge 542 toward and onto at least a portion of the second arm 534 such that the first arm 532 can also overlie at least a portion of the central portion 516 of the second panel 540.

FIG. 5D is a perspective view of the tab 510, with the three folds $F_1$, $F_2$, $F_3$ completed. With the three folds $F_1$, $F_2$, $F_3$ completed, the central portion 516 (analogous to the central portion 516 of the first and second panels 530, 540) of the tab 510 can include four fabric layers to form a bracket receiving member 504. A line of stitches 570 may be applied along or near the longitudinal axis $A_{LONG}$ to strengthen and/or couple together each of the fabric layers including the bracket receiving member 504. In addition to the four fabric layers of the bracket receiving member 504, two layers of fabric can form a first member 506 and a second member 507 of the airbag receiving member (see, e.g., the airbag coupling member 108 of FIG. 3A).

FIG. 6A is an overhead plan view of a tab 610 in a preassembled state. The tab 610 can include a first panel 630 and a second panel 640. The first panel 630 can extend from the first end 612 toward the second end 614. The second panel 640 can extend from the second end 614 toward the first end 612 to meet the first panel 630 at the foldable portion 618. Each panel 630, 640 may include a central portion 616. The fabric material of the tab 610 can include a bias or weave 622 having a bias angle 624 of about 45° relative to the longitudinal axis $A_{LONG}$ and the fold axis 620. In other embodiments, the angle 624 of the bias 622 may be another suitable angle.

The first panel 630 can include one or more first apertures 660 and one or more second apertures 662. The first panel 630 can also include a first arm 632 and a second arm 634. The first and second arms 632, 634 can include a first cut 636 and a second cut 638 wherein the first and second cuts 636, 638 substantially arc toward each other at or adjacent the central portion 616 of the first panel 630. In other words, each arm 632, 634 can be at least partially defined by the first cut 636 and the second cut 638. In the embodiment of FIG. 6A, the first cut 636 may include an arc portion 637 located at or adjacent the central portion 616 of the first panel 630. The second cut 638 can include an arc portion 639 located at or adjacent the central portion 616 of the first panel 630. The arc portions 637, 639 of the cuts 636, 638 can approach each other at or adjacent the central portion 616 of the first panel 630.

The second panel 640 can include first apertures 660 and second apertures 662, the central portion 616, and first and second lateral edges 642, 644. In the embodiment of FIG. 6A, the second panel 640 can be generally the same width as the central portions 616 of the first and second panels 630, 640. The second panel 640 can also include a first recess 646 in the first lateral edge 642 and a second recess 648 in the second lateral edge 644. The two recesses 646, 648 may be substantially U-shaped. A portion of the shape of the first arm 632 may substantially correspond to the shape of the first recess 646, and a portion of the shape of the second arm 634 may substantially correspond to the shape of the second recess 648. In other words, the medial portions of the first and second arms 632, 634 at the arc portions 637, 639 of the first and second cuts 636, 638 may generally comport to the shape of the first and second recesses 646, 648, respectively, of the first and second edges 642, 644 of the second panel 640.

The tab 610 may be folded (see arrow $F_1$) at the foldable portion 618 along the fold axis 620 such that the second panel 640 substantially overlies the first panel 630. When the tab 610 is folded, the first apertures 660 of the second panel 640 may substantially align with the first apertures 660 of the first panel 630, and the second apertures 662 of the second panel 640 may substantially align with the second apertures 662 of the first panel 630.

FIG. 6B is a top plan view of the tab 610 with the first fold $F_1$ completed. The second panel 640 overlies the first panel 630. The second arm 634 of the first panel 630 may be folded $F_2$ along the second recess 648 toward and onto at least a portion of the central portion 616 of the second panel 640.

Figure 6D:
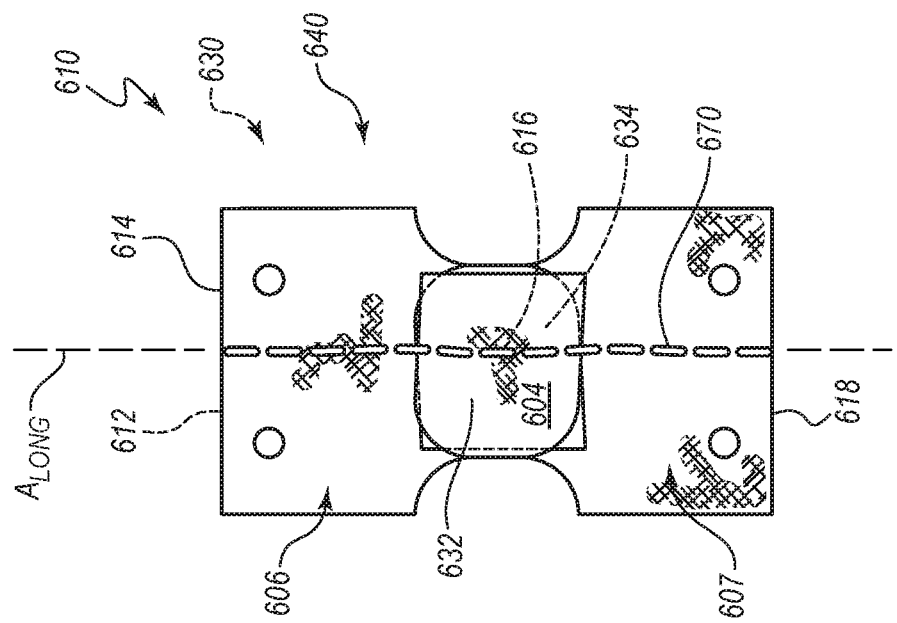
FIG. 6D is a top plan view of the tab of FIG. 6A with three folds completed.
Figure 6C:
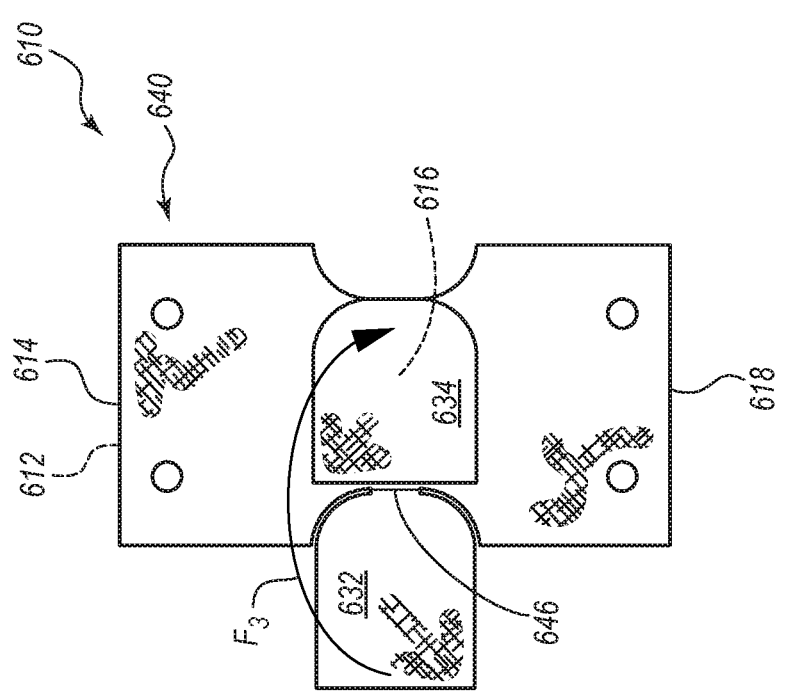
FIG. 6C is a top plan view of the tab of FIG. 6A with two folds completed.

FIG. 6C is a top plan view of the tab 610 with the first and second folds $F_1$, $F_2$ completed. The first arm 632 may be folded (see arrow $F_3$) at the first recess 646 of the second panel 640 toward and onto at least a portion of the second arm 634 such that the first arm 632 overlies at least a portion of both the second arm 634 and the central portion 616 of the second panel 640.

FIG. 6D is a top plan view of the tab 610 with the three folds $F_1$, $F_2$, $F_3$ completed. With the three folds $F_1$, $F_2$, $F_3$ completed, the first arm 632 overlies at least a portion of the second arm 634, which overlies at least a portion of the central portion 616 of the first and second panels 630, 640, such that four fabric layers (e.g., four combined layers of fabric) can form a bracket receiving member 604 of the tab 610. A line of stitches 670 may be applied at or adjacent the longitudinal axis $A_{LONG}$ to strengthen and/or couple together each of the fabric layers including the bracket receiving member 604. In addition to the four fabric layers of the bracket receiving member 604, two layers of fabric may form a first member 606 and a second member 607 of the airbag receiving member (see, e.g., the airbag coupling member 108 of FIG. 3A).

FIG. 7A is a top plan view of a tab 710 in a preassembled state. The tab 710 can include a first panel 730 and a second panel 740. The fabric material of the tab 710 can include a bias or weave 722. As shown in FIG. 7A, a bias angle 724 of the bias 722 is about 45° relative to the longitudinal axis $A_{LONG}$ and relative to a fold axis 720. In other embodiments, the angle 724 of the bias 722 may be another suitable angle.

The first panel 730 extends from a first end 712 toward a second end 714. The first panel 730 can include a first arm 732 and a second arm 734. In the embodiment of FIG. 7A, the first panel 730 is substantially as wide as the first and second arms 732, 734. The first panel 730 can include a first lateral edge 742 and a second lateral edge 744. Each arm 732, 734 can be adjacent to two wings 750. The wings 750 may extend from a central portion 716 of the first panel 730 outward to the first and second lateral edges 742, 744, respectively. The first and second arms 732, 734 may each include a first and second cut 736, 738. Each first and second cut 736, 738 can include arc portions 737, 739. The first panel 730 can also include one or more first apertures 760 and one or more second apertures 762.

The second panel 740 of the tab 710 can extend from the second end 714 toward the first end 712 to meet the first panel 730 at a foldable portion 718. The second panel 740 may include the central portion 716 and first and second recesses 746, 748. In the embodiment of FIG. 7A, the second panel 740 is substantially as wide as the central portion 716. The shape of the first and second arms 732, 734 near the central portion 716 of the first panel 730 may generally comport to the shape of the recesses 746, 748 of the second panel 740. The second panel 740 can include first and second apertures 760, 762.

The second panel 740 may be folded (see arrow $F_1$) at the foldable portion 718 along the fold axis 720 such that the second panel 740 overlies the first panel 730, with the first apertures 760 of the second panel 740 substantially aligned to the first apertures 760 of the first panel 730, and the second apertures 762 of the second panel 740 substantially aligned to the second apertures 762 of the first panel 740.

FIG. 7B is a top plan view of the tab 710 with the first fold $F_1$ completed. The first arm 732 of the first panel may be folded (see arrow $F_2$) along the first recess 746 toward and onto the central portion 716 of the second panel 740.

Figure 7D:
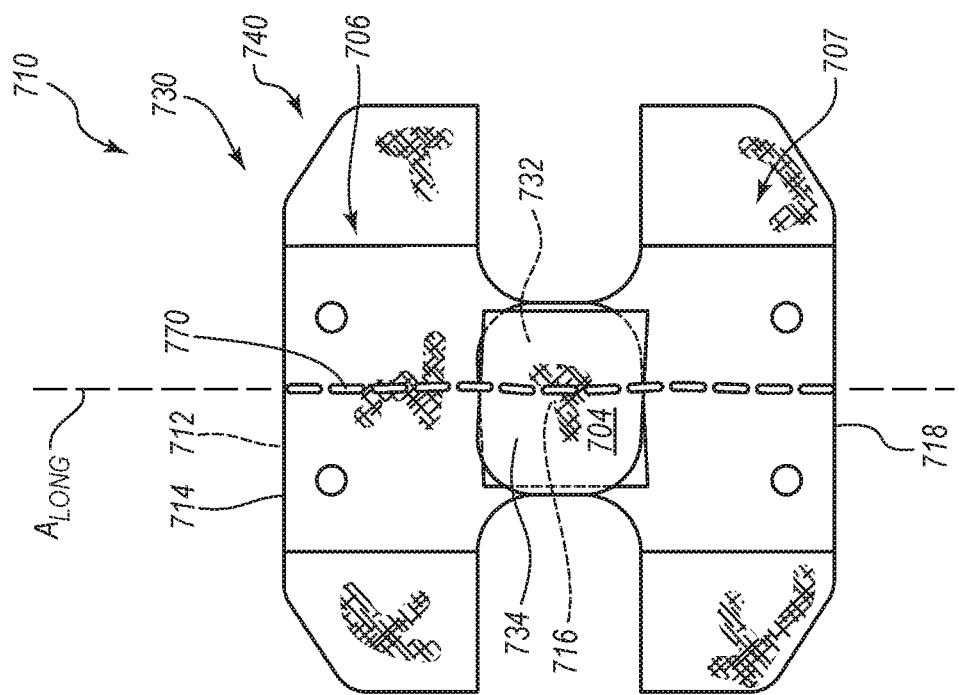
FIG. 7D is a top plan view of the tab of FIG. 7A with three folds completed.
Figure 7C:
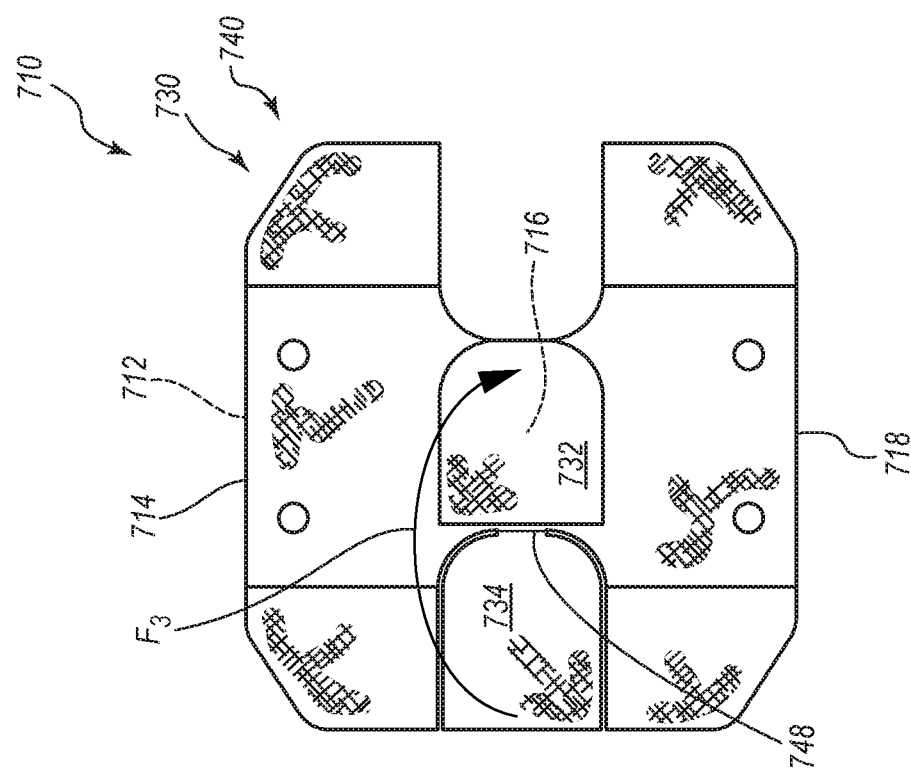
FIG. 7C is a top plan view of the tab of FIG. 7A with two folds completed.

FIG. 7C is a top plan view of the tab 710 with the two folds $F_1$, $F_2$ completed. The second arm 734 may be folded (see arrow $F_3$) along the second recess 748 toward and onto at least a portion of the first arm 732 such that the second arm 734 substantially overlies the first arm 732 and the central portion 716 of the first and second panels 730, 740.

In FIG. 7C, the second arm 734 is shown folding to overlie the first arm 732 after the third fold $F_3$. In some embodiments, the folds $F_2$ and $F_3$ may be exchanged such that the second arm 734 is folded before the first arm 732 is folded, resulting in the first arm 732 substantially overlying the second arm 734.

FIG. 7D is a top plan view of the tab 710 with the three folds $F_1$, $F_2$, $F_3$ completed. As shown, the second arm 734 substantially overlies the first arm 732 and the central portion 716 of the first and second panels 730, 740 to form a bracket receiving member 704. A line of stitches 770 may be applied to strengthen and/or couple together the four layers of fabric of the bracket receiving member 704. In addition to the four fabric layers of the bracket receiving member 704, two layers of fabric may form a first member 706 and a second member 707 of the airbag receiving member (see, e.g., the airbag coupling member 108 of FIG. 3A).

Figure 8A:
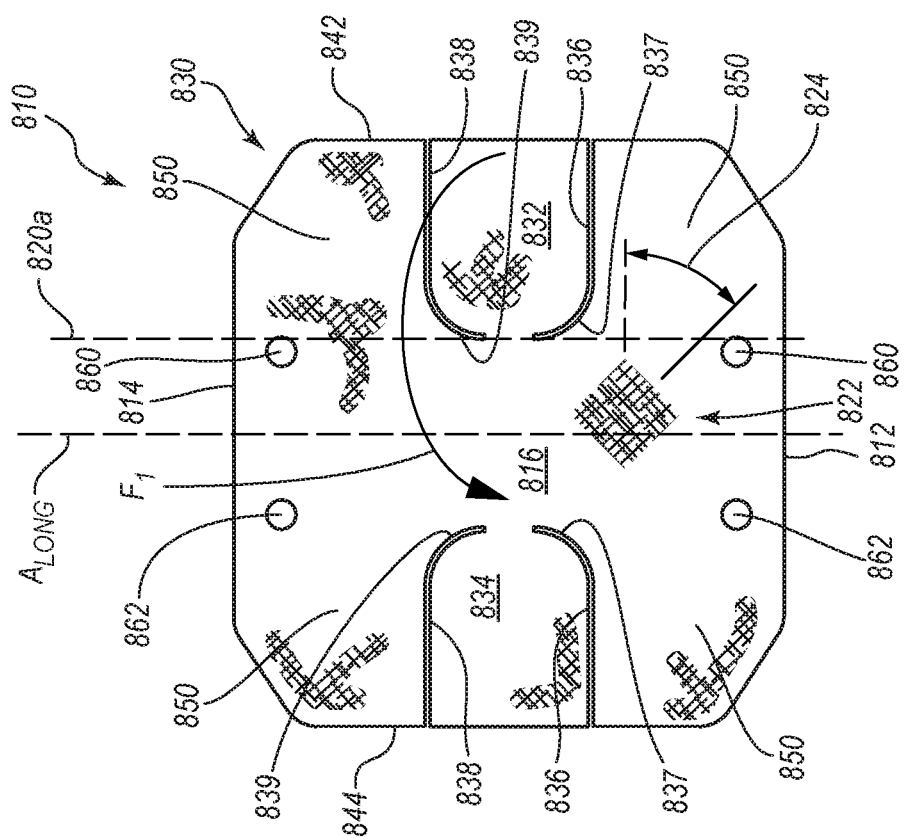
FIG. 8A is a top plan view of a tab, according to another embodiment of the present disclosure, in a preassembled state.

FIG. 8A is a top plan view of a tab 810 in a preassembled state. In the embodiment of FIG. 8A, the first panel is integral with the second panel. In other words, the tab 810 consists of a single panel 830 incorporating features of, or similar to, the previously described first and second panels (130, 140, 530, 540, etc.). The panel 830 of the tab 810 can include a first end 812 and a second end 814, a first lateral edge 842 and a second lateral edge 844, a first arm 832 and a second arm 834, and first apertures 860 and second apertures 862. The first and second arms 832, 834 may be defined by first and second cuts 836, 838. The first and second cuts 836, 838 can include arc portions 837, 839. Two wings 850 may be disposed adjacent to each of the first and second arms 832, 834. The panel 830 may be formed from a fabric material. The fabric material of the panel 830 can include a bias or weave 822. In the embodiment of FIG. 8A, the bias 822 has an angle 824 of about 45° relative to the longitudinal axis $A_{LONG}$. Other suitable angles 824 are also within the scope of this disclosure. The first arm 832 may be folded $F_1$ along a fold axis 820a toward and onto at least a portion of the central portion 816 of the panel 830.

Figure 8C:
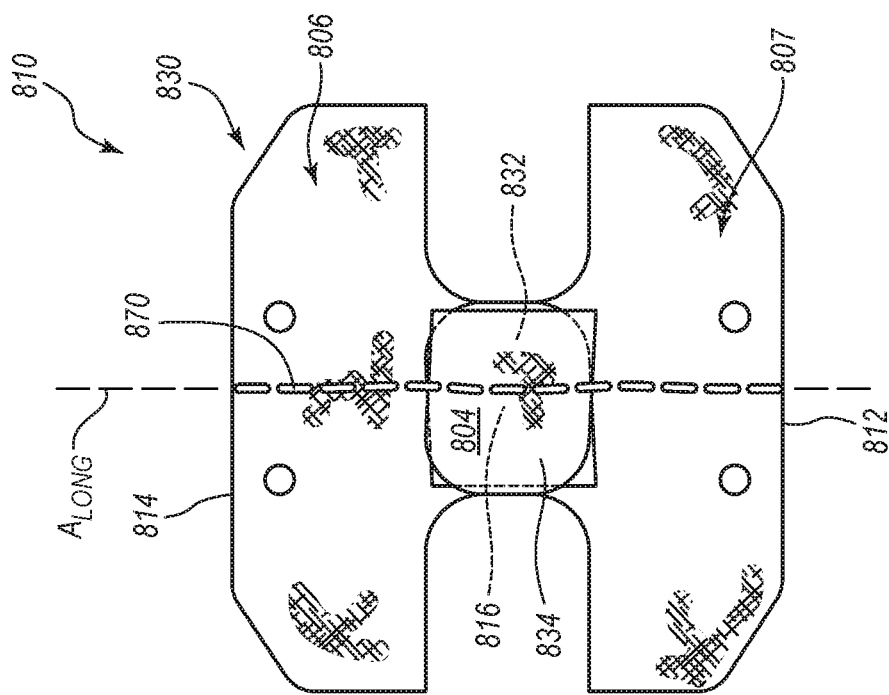
FIG. 8C is a top plan view of the tab of FIG. 8A with two folds completed.
Figure 8B:
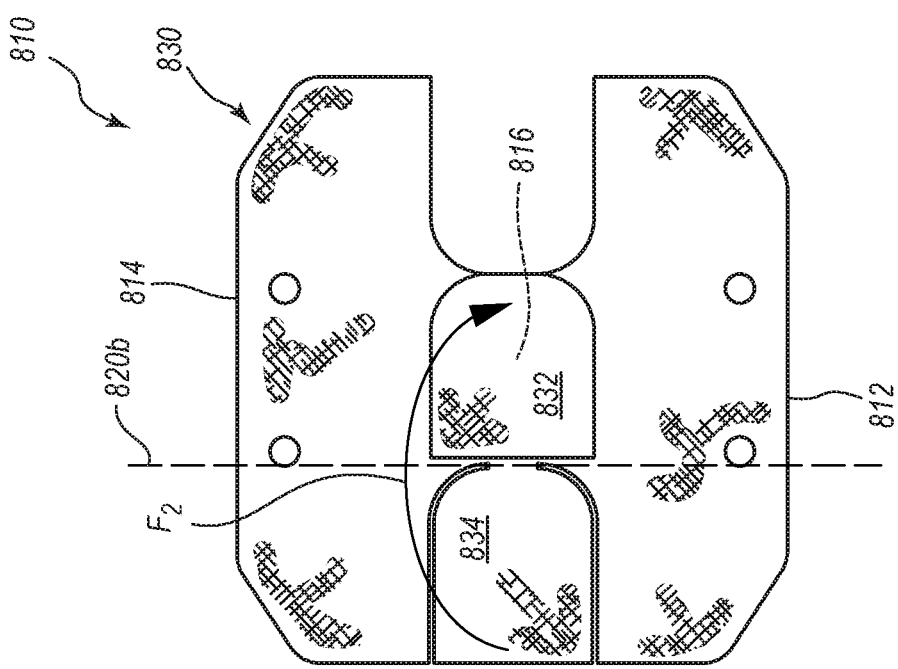
FIG. 8B is a top plan view of the tab of FIG. 8A with a first fold completed.

FIG. 8B is a top plan view of the tab 810 with the first fold $F_1$ completed. The first arm 832 substantially overlies the central portion 816 of the panel 830. The second arm 834 may be folded (see arrow $F_2$) at a fold axis 820b toward and onto at least a portion of the first arm 832 such that the second arm 834 substantially overlies the first arm 832 and the central portion 816 of the panel 830.

FIG. 8C is a top plan view of the tab 810 with the folds $F_1$, $F_2$ completed. The second arm 834 can substantially overlie the first arm 832 and the central portion 816 of the panel 830. A line of stitches 870 may be applied at or adjacent the longitudinal axis $A_{LONG}$ to strengthen and/or couple together each of the fabric layers including a bracket receiving member 804.

The embodiment of FIGS. 8A-8C may form a single layer at first and second portions 806, 807 of the airbag coupling member (see, e.g., the airbag coupling member 108 of FIG. 3A) and may form a three-layer bracket receiving member 804. The three-layer bracket receiving member 804 may provide increased resistance against tearing, rupturing, or failure under the one or more forces that may be applied to the tab 810 (e.g., during a collision event) as compared to mounting tabs having fewer layers, while providing for greater compaction of an inflatable airbag system into which the tab 810 may be incorporated (e.g., when the inflatable airbag is in a packaged state).

Figure 9A:
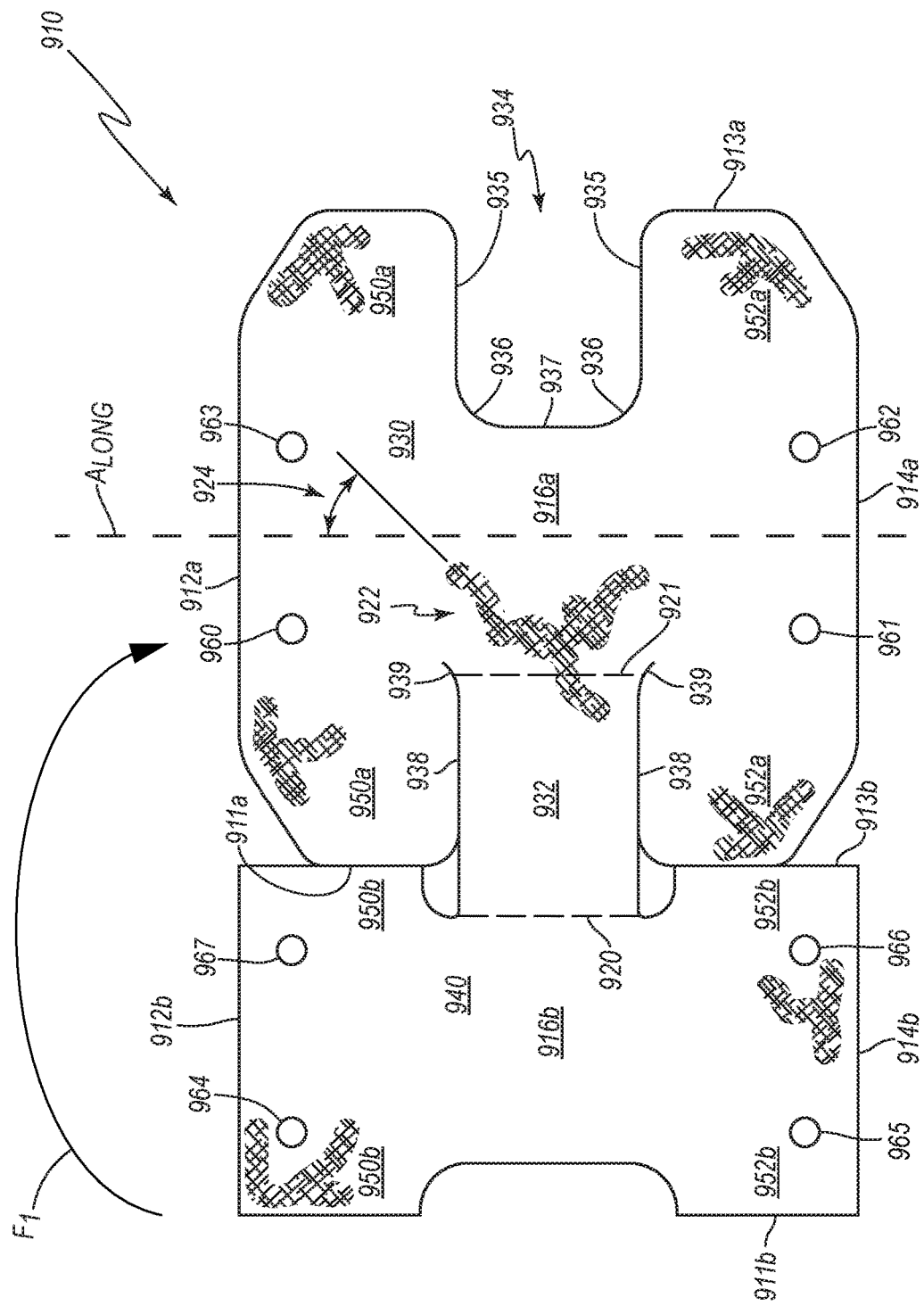
FIG. 9A is a top plan view of a tab according to another embodiment of the present disclosure, in a preassembled state.

FIG. 9A is a top plan view of a tab 910 according to an embodiment of the present disclosure. The tab 910 may be formed from a fabric material, such that a weave or bias 922 of the fabric is at an angle 924 relative to a longitudinal axis $A_{LONG}$ of the tab 910. In the embodiment of FIG. 9A, the bias 922 angle 924 is 45°. Other suitable angles 924 are also within the scope of this disclosure.

The tab 910 may comprise a first panel 930 and a second panel 940. In some embodiments, the first panel 930 is integral with the second panel 940. In other embodiments, the first panel 930 may be coupled to the second panel 940. The first panel 930 may have a shape similar to an uppercase letter "I." The second panel 940 may also have a shape similar to an uppercase letter "I." The first panel 930 extends laterally from a first longitudinal edge 911a to a second longitudinal edge 913a, and longitudinally from a first lateral edge 912a to a second lateral edge 914a.

The tab 910 may comprise a connecting member 932 that couples the first panel 930 and second panel 940. In some embodiments, the connecting member 932 may be integral with the first panel 930 and the second panel 940. In other embodiments, the connecting member 932 may be a strap where a first end couples to the first panel 930, and a second end couples to the second panel 940. The connecting member 932 may be defined by a pair of generally parallel cuts 938 disposed approximately perpendicular to the first longitudinal edge 911a. The parallel cuts 938 terminate at arcuate portions 939 near a central portion 916a of the first panel 930. A recess 934 is defined on an opposite side of the central portion 916a by a pair of parallel cuts 935 generally perpendicular to the second longitudinal edge 913a. The parallel cuts 935 may have arcuate portions 936 near the central portion 916a, with the arcuate portions 936 connected by a cut 937 which is generally parallel to the second longitudinal edge 913a. For reference, the connecting member 932 and the recess 934 defined by cuts 935, 937 are, relative to the first panel 930, in generally the same locations, respectively, as the first arm 832 and second arm 834 relative to the first panel 830 of FIG. 8A. The central portion 916a of the first panel 930 extends laterally approximately from the cut 937 to a second fold line 921, and longitudinally from the first lateral edge 912a to the second lateral edge 914a. The combination of the longitudinal and lateral edges 911a-914a, the recess 934, and the cuts 938 defines four wings 950a, 952a of the first panel 930. Upper wings 950a extend perpendicularly in opposite directions relative to the longitudinal axis $A_{LONG}$. Lower wings 952a similarly extend perpendicularly in opposite directions relative to the longitudinal axis $A_{LONG}$.

The first panel 930 further comprises plurality of apertures. In the illustrated embodiment of FIG. 9A, the first panel 930 comprises four apertures 960, 961, 962, 963. Two apertures 960, 961 are disposed within the central portion 916a and toward the first longitudinal edge 911a such that a line drawn center-to-center of the apertures 960, 961 would lie parallel to a longitudinal axis $A_{LONG}$ of the first panel 930. Two apertures 962, 963 are similarly disposed within the central portion 916a and toward the second longitudinal edge 913a equidistant from the longitudinal axis $A_{LONG}$ of the first panel 930 relative to the two apertures 960, 961. The two apertures 960, 963 are disposed near, and equidistant from, the first lateral edge 912a. The two apertures 961, 962 are similarly disposed near and equidistant from the second lateral edge 914a. The distance of the two apertures 961, 962 from the second lateral edge 914a may be equal or approximately equal to the distance of the two apertures 960, 963 from the first lateral edge 912a.

The connecting member 932 extends from the arcuate portions 939 of the cuts 938 laterally between the central portion 916a of the first panel 930 and a central portion 916b of the second panel 940. The cuts 938 defining the connecting member 932 may extend towards the second panel 940 whereby the connecting member 932 generally couples the central portion 916a of the first panel 930 and the central portion 916b of the second panel 940. In other words, the first end of the connecting member 932 couples at the central portion 916a of the first panel 930, and the second end of the connecting member 932 couples at the central portion 916b of the second panel 940.

The second panel 940 may extend longitudinally from a first lateral edge 912b to a second lateral edge 914b, and laterally from a first longitudinal edge 911b to a second longitudinal edge 913b. The lateral edge 912b may, in one embodiment, be a logical extension of the lateral edge 912a, and the lateral edge 914b may be a logical extension of the lateral edge 914a. A distance between the longitudinal edges 911b and 913b may be equal to, greater than, or less than a distance between the longitudinal edges 911a and 911b. The second panel 940 may further comprise four wings 950b, 952b. Each wing 950b corresponds to a wing 950a of the first panel 930, and each wing 952b similarly corresponds to a wing 952a of the first panel 930. In other words, the upper wings 950b of the second panel 940 correspond to the upper wings 950a of the first panel 930, and the lower wings 952b of the second panel 940 correspond the lower wings 952a of the first panel 930. Each wing 950b, 952b may have similar dimensions and shape characteristics as each corresponding wing 950a, 952a. In some embodiments, one or more wings 950b, 952b may be laterally narrower than the respective corresponding wing 950a, 952a, or may be longitudinally shorter than the respective corresponding wing 950a, 952a, or both. In some embodiments, one or more wings 950b, 952b may be laterally wider than the respective corresponding wing 950a, 952a, or may be longitudinally longer than the respective corresponding wing 950a, 952a, or both.

In some embodiments, the second panel 940 may be narrower laterally than is the first panel 930. In one embodiment, the first panel 930 may be laterally narrower than the second panel 940. The second panel 940 comprises a first fold line 920. The second panel 940 further comprises four apertures 964, 965, 966, 967. Two apertures 964, 965 may be disposed in the central portion 916b distal relative to the connecting member 932 such that a line drawn center-to-center of the apertures 964, 965 would lie parallel to the longitudinal axis $A_{LONG}$. Two apertures 966, 967 may be similarly disposed within the central portion 916a and medial relative to the connecting member 932 such that a line drawn center-to-center of the apertures 966, 967 would lie parallel to the longitudinal axis $A_{LONG}$. A distance between the two apertures 964, 967, and between the two apertures 965, 966, may be equal to the distance between the two apertures 960, 963 and the two apertures 961, 962. In other words, the distance between apertures of each aperture pair 960-963, 961-962, 964-967, and 965-966 may be equal. Furthermore, a distance between apertures of each aperture pair 960-961, 962-963, 964-965, 966-967 may be equal.

The first and second fold lines 920, 921 are parallel to the longitudinal axis $A_{LONG}$. A first fold or roll $F_1$ is made whereby the tab 910 is folded along the first fold line 920. By the first fold or roll $F_1$, the second panel 940 and, more particularly, a portion of the central portion 916b may roll over and onto the connecting member 932. The central portion 916b of the second panel 940 may be configured to be folded or rolled with the connecting member 932 a plurality of times.

FIG. 9B is a top plan view of the tab 910 of FIG. 9A after the first fold $F_1$ has been completed. The upper and lower wings 950a, 952a of the first panel 930 are shown for reference, as are the longitudinal edges 911a, 913a and lateral edges 912a, 914a. The central portion 916a of the first panel 930, and the central portion 916b of the second panel 940 are shown. Each of the apertures 960-967 is also shown. With the first fold $F_1$ completed, the central portion 916b of the second panel 940 overlies the connecting member 932, and the tab 910 is ready for a second fold $F_2$ along the second fold line 921.

Figure 9C:
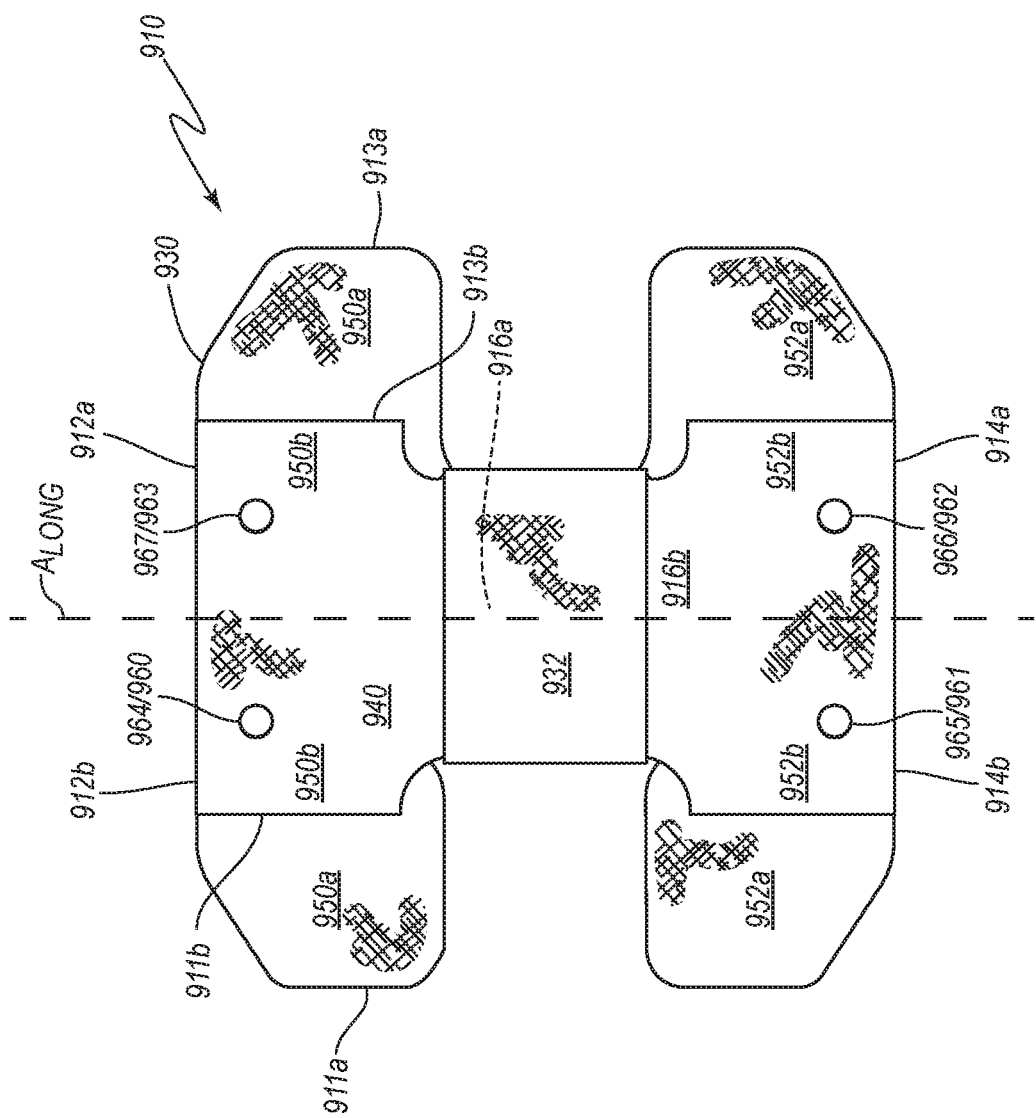
FIG. 9C is a top plan view of the tab of FIG. 9A with a second fold or roll complete.

FIG. 9C is a top plan view of the tab 910 of FIGS. 9A and 9B after the second fold $F_2$ has been completed. The upper and lower wings 950a, 952a of the first panel 930 are shown for reference, as are the longitudinal edges 911a, 913a. The central portion 916b of the second panel 940 is configured to fold over the connecting member 932 and into alignment with the central portion 916a of the first panel. With the second fold $F_2$ completed, the central portion 916b of the second panel 940 overlies the central portion 916a of the first panel 930. The connecting member 932 overlies a portion of the central region 916b of the second panel 940. With the first panel 930 and second panel 940 in the rolled configuration, a bracket receiving member (see 904 in FIG. 10) is formed. In the embodiment of FIG. 9C, the first lateral edge 912b may overlie the first lateral edge 912a, and the second lateral edge 914b may overlie the second lateral edge 914a. The apertures 964-967 of the second panel 940 coaxially overlie respective apertures 960-963 of the first panel 930. In other words, the aperture 964 coaxially overlies the aperture 960; the aperture 965 coaxially overlies the aperture 961; the aperture 966 coaxially overlies the aperture 962; and the aperture 967 coaxially overlies the aperture 963.

Figure 10:
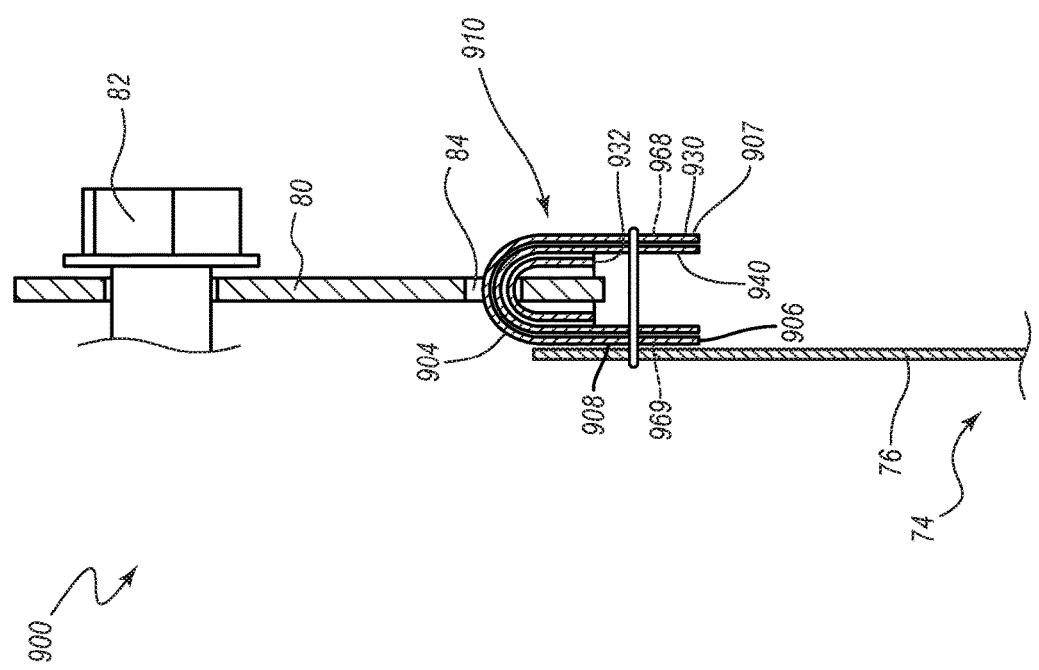
FIG. 10 is a partial cross-sectional view of a mounting tab assembly configured with the tab of FIGS. 9A-9C, according to an embodiment of the present disclosure.

With the second fold $F_2$ completed, the wings 950a, 950b form a first portion of an airbag coupling member, and the wings 952a, 952b form a second portion of the airbag coupling member, whereby four layers of fabric are disposed at the airbag coupling member (see 906, 907, 908 in FIG. 10). Furthermore, the central portions 916a, 916b are configured to be aligned whereby the apertures 960, 961, 964, 965 are coaxially disposed and define a first aperture (see 968 in FIG. 10) through the four layers of the airbag coupling member. Similarly, the apertures 962, 963, 966, 967 are coaxially disposed and define a second aperture (see 969 in FIG. 10) through the four layers of the airbag coupling member, the second aperture laterally offset from the first aperture.

FIG. 10 is a simplified cross-sectional view of a mounting tab assembly 900 configured with the tab 910 of FIGS. 9A-9C, according to an embodiment of the present disclosure. The bracket 80 and mounting bolt 82 are shown for reference. The aperture 84 for the tab 910 is also shown, with the assembled tab 910 installed. The assembled tab 910 comprises a bracket receiving member 904 configured to be disposed through the aperture 84 of the bracket 80 to be mounted to a vehicle structure to secure the tab 910 to a vehicle. The assembled tab 910 further comprises an airbag coupling member 908. With the assembled tab 910 fitted to the aperture 84, a first portion 906 and a second portion 907 of the tab 910 are disposed on opposite sides of the bracket 80. The first and second portions 906, 907 of the tab 910 may be coupled together, as by stitching or any suitable manner, whereby the tab 910 is secured to the bracket 80. The edge 76 of the side air curtain 74 (or other airbag device) may be coupled to the tab 910 at the airbag coupling member 908 by stitching or any suitable manner.

The bracket receiving member 904 comprises three layers: the connecting member 932, the first panel 930, and the second panel 940. In the embodiment of FIG. 10, the connecting member 932 of the tab 910 is adjacent the bracket 80, with the second panel 940 overlying the connecting member 932, and the first panel 930 overlying the second panel 940. The bracket receiving member 904 is configured to be disposed through the aperture 84 of the bracket 80 and folded upon itself whereby the bracket receiving member 904 comprises six layers. As described in conjunction with FIGS. 3A, 3B, the tab 910 may be installed to the bracket 80 whereby the layer ordering is reversed. In other words, in one embodiment, the first panel 930 may be disposed adjacent the bracket 80, with the second panel 940 overlying the first panel 930, and the connecting member 932 overlying the second panel 940.

In the simplified illustration of FIG. 10, the coupling of the first portion 906 to the second portion 907 is implied by an unlabeled stitch line; however, any suitable stitching configuration may be employed (e.g., see FIGS. 3A and 3B). Similarly, another coupling method suitable for the application may be employed as appropriate. In other words, the illustration of an implied stitch line is for convenience only and not a limitation of the disclosure. Furthermore, in one embodiment, a reinforcing member, which is in many respects similar to the connecting member 932, may be added to the tab 910 to provide one or more additional layers of fabric within the mounting tab assembly 900.

Throughout this specification, the phrase "coupled to" refers to any form of interaction between two or more entities, including mechanical, electrical, magnetic, electromagnetic, fluid, and thermal interaction. Two components may be coupled to each other even though they are not in direct contact with each other.

The terms "a" and "an" can be described as one, but not limited to one. For example, although the disclosure may recite a tab having "a line of stitches," the disclosure also contemplates that the tab can have two or more lines of stitches.

Unless otherwise stated, all ranges include both endpoints and all numbers between the endpoints.

The phrase "vehicle occupant position" refers to a position in which an occupant is generally positioned when seated in a seat of a vehicle. The term "occupant" refers to a person or crash test dummy within a vehicle.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶6. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. A tab for securing an airbag to a vehicle, the tab comprising:
   a first panel comprising a first I-shape;
   a second panel comprising a second I-shape; and
   a connecting member that couples the first panel to the second panel, wherein a first end of the connecting member couples to a central portion between a pair of upper wings and a pair of lower wings of the first panel, and a second end of the connecting member couples to a central portion between a pair of upper wings and a pair of lower wings of the second panel,
   wherein the central portion of the second panel is configured to roll over the connecting member and into alignment with the central portion of the first panel in a rolled configuration.

2. The tab of claim 1, wherein the aligned central portions of the first panel and the second panel in the rolled configuration form a bracket receiving member to be disposed through an aperture of a bracket that is to be mounted on a vehicle structure to secure the tab to the vehicle, and
   wherein the first panel and the second panel are configured to be secured to the airbag to secure the airbag to the vehicle.

3. The tab of claim 2, wherein the bracket receiving member comprises three layers of material to be disposed through the aperture of the bracket.

4. The tab of claim 2, wherein the bracket receiving member is configured to be folded on itself such that six layers of material are disposed at the bracket receiving member when the tab is in a folded configuration.

5. The tab of claim 1, wherein, in the rolled configuration, wings of the first panel align with wings of the second panel.

6. The tab of claim 5, wherein a length of the wings of the first panel is greater than a length of the wings of the second panel.

7. The tab of claim 1, wherein the central portion of the second panel is configured to roll with the connecting member.

8. The tab of claim 1, wherein the first panel comprises a plurality of apertures and the second panel comprises a plurality of apertures and, in the rolled configuration, each aperture of the first panel aligns with a corresponding aperture of the second panel.

9. The tab of claim 1, wherein, in the rolled configuration, first wing portions of the first and second panels at a first end of the central portions form a first portion of an airbag coupling member, and second wing portions of the first and second panels at a second end of the central portions form a second portion of the airbag coupling member,
   wherein the tab is configured to be folded on itself to dispose the first and second portions of the airbag coupling member adjacent each other in a folded configuration forming the airbag coupling member, and
   wherein, in the folded configuration, four layers of material are disposed at the airbag coupling member.

10. The tab of claim 9, wherein a first aperture extends through each of the four layers of material at the airbag coupling member.

11. The tab of claim 10, wherein a second aperture extends through each of the four layers of material at a central portion of the airbag coupling member at a position laterally offset from the first aperture.

12. The tab of claim 1, wherein the first and second panels are formed from a fabric material.

13. A tab for securing an airbag to a vehicle, the tab comprising:
- a first panel comprising a central portion, a pair of upper wings that extend perpendicular to a longitudinal axis of the central portion in opposite directions, and a pair of lower wings that extend perpendicular to the longitudinal axis of the central portion in opposite directions;
- a second panel comprising a central portion, a pair of upper wings that extend perpendicular to a longitudinal axis of the central portion in opposite directions, and a pair of lower wings that extend perpendicular to the longitudinal axis of the central portion in opposite directions; and
- a connecting member that couples the first panel to the second panel, wherein a first end of the connecting member couples to the central portion of the first panel between the pair of upper wings and the pair of lower wings of the first panel, and a second end of the connecting member couples to the central portion of the second panel between the pair of upper wings and the pair of lower wings of the second panel,
- wherein the central portion of the second panel is configured to roll over the connecting member, and wherein the central portion of the second panel aligns with the central portion of the first panel in a rolled configuration.

14. The tab of claim 13, wherein the aligned central portions of the first panel and the second panel in the rolled configuration form a bracket receiving member, and
- wherein the bracket receiving member of the tab is to be disposed through an aperture of a bracket that is to be mounted on a vehicle structure to secure the tab to the vehicle, and
- wherein the first panel and the second panel are configured to be secured to the airbag to secure the airbag to the vehicle.

15. The tab of claim 14, wherein the bracket receiving member comprises three layers of material to be disposed through the aperture of the bracket, and wherein six layers of material are disposed at the bracket receiving member when the tab is in a folded configuration.

16. The tab of claim 14, wherein, in the rolled configuration, the first panel comprises a first recess defined by one upper wing, the central portion, and one lower wing and extending inward from a first lateral edge of the first panel, and a second recess defined by an opposing upper wing, the central portion, and an opposing lower wing and extending inward from a second lateral edge of the first panel, and
- wherein, in the rolled configuration, the second panel comprises a third recess defined by one upper wing, the central portion, and one lower wing and extending inward from a first lateral edge of the second panel, and
- a fourth recess defined by an opposing upper wing, the central portion, and an opposing lower wing and extending inward from a second lateral edge of the second panel.

17. A tab for securing an airbag to a vehicle, the tab comprising:
- a first panel comprising a central portion disposed between a pair of upper wings and a pair of lower wings of the first panel;
- a second panel coupled to the first panel, the second panel comprising a central portion disposed between a pair of upper winds and a pair of lower winds of the second panel, wherein the tab is configured to be folded to align the central portions of the first panel and the second panel in an aligned configuration; and
- a connecting member that couples the first panel to the second panel, wherein a first end of the connecting member couples to the central portion of the first panel between the pair of upper wings and the pair of lower wings of the first panel, and a second end of the connecting member couples to the central portion of the second panel between the pair of upper wings and the pair of lower wings of the second panel.

18. The tab of claim 17, wherein the aligned central portions of the first panel and the second panel in the aligned configuration form a bracket interface member,
- wherein the bracket interface member of the tab is to be disposed through an aperture of a bracket that is to be mounted on a vehicle structure to secure the tab to the vehicle, and
- wherein the first panel and the second panel are configured to be secured to the airbag to secure the airbag to the vehicle.

19. The tab of claim 18, wherein the bracket interface member comprises three or more layers of material to be disposed through the aperture of the bracket, and wherein six or more layers of material are disposed at the bracket interface member when the tab is in a folded configuration.

* * * * *